(12) United States Patent
Wang et al.

(10) Patent No.: US 12,646,260 B2
(45) Date of Patent: Jun. 2, 2026

---

(54) IMAGE GENERATION METHOD, APPARATUS, AND SYSTEM, AND COMPUTER-READABLE STORAGE MEDIUM

(71) Applicant: HUAWEI TECHNOLOGIES CO., LTD., Shenzhen (CN)

(72) Inventors: Minbo Wang, Shenzhen (CN); Xianyi Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 210 days.

(21) Appl. No.: 18/540,763

(22) Filed: Dec. 14, 2023

(65) Prior Publication Data

US 2024/0119676 A1 Apr. 11, 2024

Related U.S. Application Data

(63) Continuation of application No. PCT/CN2022/077772, filed on Feb. 24, 2022.

(30) Foreign Application Priority Data

Jul. 29, 2021 (CN) .......................... 202110866817.7
Aug. 13, 2021 (CN) .......................... 202110932007.7

(51) Int. Cl.
G06T 19/00 (2011.01)
G06T 3/40 (2024.01)
(Continued)

(52) U.S. Cl.
CPC ................ G06T 19/00 (2013.01); G06T 3/40 (2013.01); G06T 7/11 (2017.01); G06T 7/74 (2017.01);
(Continued)

(58) Field of Classification Search
CPC .............. G06T 19/00; G06T 3/40; G06T 7/11
See application file for complete search history.

(56) References Cited

U.S. PATENT DOCUMENTS

2018/0232781 A1 8/2018 Kim
2022/0270387 A1* 8/2022 Bai .......................... G06T 17/00

FOREIGN PATENT DOCUMENTS

CN 206283581 U 6/2017
CN 107547775 A 1/2018
(Continued)

*Primary Examiner* — Matthew Salvucci

(57) ABSTRACT

This application discloses an image generation method, apparatus, and system, and a computer-readable storage medium, and belongs to the field of image processing technologies. A terminal or a central control platform first obtains a human body portrait and human body description information of the human body portrait, and obtains a target background template and target template information of the target background template. The human body description information includes human body posture information, the target background template includes a preset position matching the human body portrait, and the target template information includes human body posture information associated with the preset position. Then the terminal or the central control platform places, based on the human body description information and the target template information, the human body portrait at a preset position that is in the target background template and that matches the human body portrait, to obtain a synthesized image.

20 Claims, 15 Drawing Sheets

(51) Int. Cl.
  *G06T 7/11* (2017.01)
  *G06T 7/73* (2017.01)
(52) U.S. Cl.
  CPC *G06T 2200/04* (2013.01); *G06T 2207/20221*
    (2013.01); *G06T 2207/30196* (2013.01)

(56) References Cited

FOREIGN PATENT DOCUMENTS

| | | | |
|---|---|---|---|
| CN | 107610171 | A | 1/2018 |
| CN | 105208458 | B | 10/2018 |
| CN | 109800653 | A | 5/2019 |
| CN | 111292337 | A | 6/2020 |
| CN | 107426524 | B | 7/2020 |
| CN | 111640167 | A | 9/2020 |
| CN | 112116673 | A | 12/2020 |
| CN | 112508639 | A | 3/2021 |
| CN | 112866577 | A | 5/2021 |
| JP | 6868875 | B1 | 5/2021 |
| WO | 2017130158 | A1 | 8/2017 |

* cited by examiner

_300_

Human body
posture: sitting
Human body
deflection angle: 45°

Human body posture:
sitting
Human body
deflection angle: –45°

Human body
posture: standing
Human body
deflection angle: 0°

Human body
posture: sitting
Human body
deflection angle: 0°

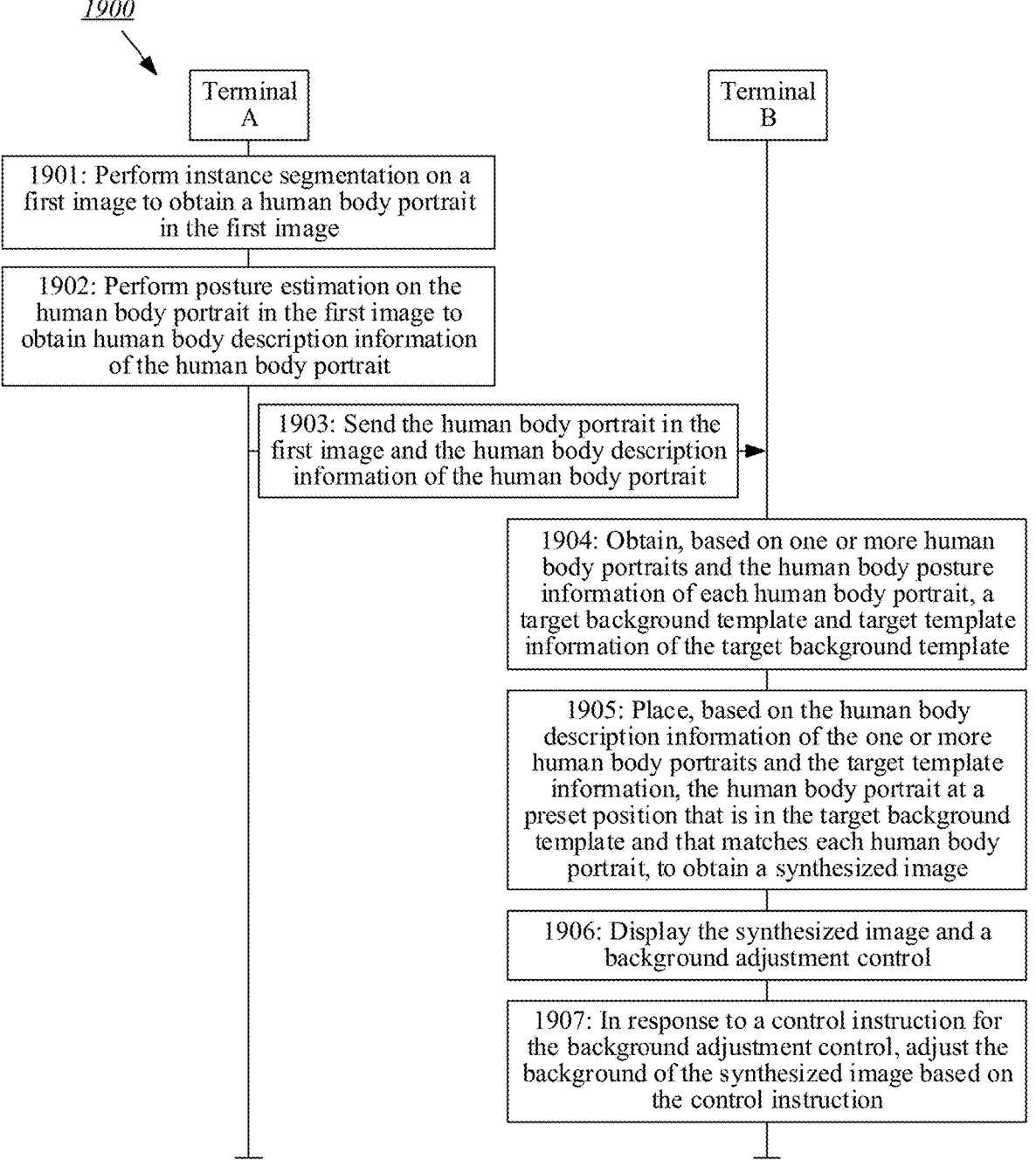

*1900*

Terminal A

Terminal B

1901: Perform instance segmentation on a first image to obtain a human body portrait in the first image 1902: Perform posture estimation on the human body portrait in the first image to obtain human body description information of the human body portrait 1903: Send the human body portrait in the first image and the human body description information of the human body portrait 1904: Obtain, based on one or more human body portraits and the human body posture information of each human body portrait, a target background template and target template information of the target background template 1905: Place, based on the human body description information of the one or more human body portraits and the target template information, the human body portrait at a preset position that is in the target background template and that matches each human body portrait, to obtain a synthesized image 1906: Display the synthesized image and a background adjustment control 1907: In response to a control instruction for the background adjustment control, adjust the background of the synthesized image based on the control instruction

FIG. 19

Sixth image

Seventh image

Synthesized image

1

IMAGE GENERATION METHOD, APPARATUS, AND SYSTEM, AND COMPUTER-READABLE STORAGE MEDIUM

CROSS-REFERENCE TO RELATED APPLICATIONS

This application is a continuation of International Application No. PCT/CN2022/077772, filed on Feb. 24, 2022, which claims priority to Chinese Patent Application No. 202110866817.7, filed on Jul. 29, 2021 and Chinese Patent Application No. 202110932007.7, filed on Aug. 13, 2021. All of the aforementioned patent applications are hereby incorporated by reference in their entireties.

TECHNICAL FIELD

This application relates to the field of image processing technologies, and in particular, to an image generation method, apparatus, and system, and a computer-readable storage medium.

BACKGROUND

In a modern conference system, with increasing cross-region collaborations and an increasing cost requirement, a demand for a video conference is increasing. To protect privacy of an environment in which a user is located, a real background in a video conference image needs to be replaced with a virtual background.

In some studies, a human body portrait is obtained by performing instance segmentation on a video conference image, and then the human body portrait is fused into a virtual background to obtain a synthesized image.

However, a problem that a human body portrait does not match the virtual background may occur in the synthesized image, resulting in a poor imaging effect of the synthesized image.

SUMMARY

This application provides an image generation method, apparatus, and system, and a computer-readable storage medium, to resolve a current problem that an imaging effect of a synthesized image is poor due to mismatch between a human body portrait and a virtual background.

According to a first aspect, an image generation method is provided, and is applied to a terminal or a central control platform. The central control platform refers to a control platform that can control and manage a plurality of terminals. The method includes: obtaining one or more human body portraits in at least one image and human body description information of each human body portrait, where the human body description information includes human body posture information; obtaining a target background template and target template information of the target background template, where the target background template includes a preset position matching each human body portrait, and the target template information includes human body posture information associated with the preset position; and placing, based on the human body description information and the target template information, each human body portrait at the preset position that is in the target background template and that matches each human body portrait, to obtain a synthesized image.

In this application, the preset position associated with the human body posture information is preconfigured in the background template. When the background of the image is changed, the human body portrait is placed, based on the human body posture information of the human body portrait in the image, at the preset position that is in the background template and that matches the human body portrait, so that the human body portrait matches the background template, thereby achieving a good imaging effect of the synthesized image.

Optionally, the human body posture information includes a human body deflection angle and/or a human body posture. Optionally, the human body posture is standing, sitting, lying, crouching, or the like. In this application, the human body posture is used to describe that a person is in a state such as standing, sitting, lying, or crouching.

Optionally, the human body description information further includes a first location indication for a human body key point in each human body portrait, and the target template information further includes a second location indication for a human body key region at the preset position. An implementation process of placing, based on the human body description information and the target template information, each human body portrait at the preset position that is in the target background template and that matches each human body portrait includes: arranging, based on the first location indication and the second location indication, the human body key point in each human body portrait into the human body key region corresponding to the preset position that is in the target background template and that matches each human body portrait.

In this application, the human body key region refers to a region in which the human body key point is located. The human body key point in the human body portrait is arranged in a human body key point region corresponding to the preset position that is in the target background template and that matches each human body portrait, so that a fusion effect of the human body portrait and the target background template can be improved, thereby improving an imaging effect of the synthesized image.

Optionally, the one or more human body portraits include a first human body portrait and a second human body portrait that have same human body posture information, and an original size of the first human body portrait is greater than an original size of the second human body portrait. A distance between a preset position at which the first human body portrait is located and a target camera is less than a distance between a preset position at which the second human body portrait is located and the target camera, and a target size of the first human body portrait in the synthesized image is greater than a target size of the second human body portrait. The target camera is a camera corresponding to the target background template.

The target camera is a camera corresponding to the target background template, which may be understood that the target background template is obtained by shooting by the target camera, that is, the target camera is a real camera, and the target background template is a real scene portrait; or the target background template is obtained by simulating shooting by the target camera, that is, the target camera is a virtual camera, and the target background template is a constructed virtual scene portrait. Regardless of whether the target camera is a real camera or a virtual camera, a camera parameter of the target camera always refers to a camera parameter used for shooting the target background template.

In this application, when the human body portrait is arranged in the preset position of the background template, a principle of "near is large, and far is small" may be followed, so that a size of a human body portrait closer to the target camera in the synthesized image is larger, and a size of a human body portrait farther from the target camera is smaller, so that an imaging effect of the synthesized image is closer to a real image shot by a real camera. In addition, in a plurality of obtained human body portraits with the same human body posture information, a human body portrait with a larger size is arranged at a preset position closer to the target camera, and a human body portrait with a smaller size is arranged at a preset position farther away from the target camera. In this way, when a size of the human body portrait is adjusted, especially when the size of the human body portrait is enlarged, distortion degrees of the plurality of human body portraits can be unified, and when the human body portrait with a smaller size is arranged at a preset position closer to the target camera, a case in which an excessively large magnification multiple of the human body portrait causes a serious distortion degree of the human body portrait can be avoided, so that an imaging effect of the synthesized image is good.

In a first implementation, the target template information further includes a distance between an imaging object corresponding to the preset position and an optical center of the target camera along a principal optical axis direction of the target camera and a camera parameter of the target camera, where the target camera is the camera corresponding to the target background template. An implementation process of placing each human body portrait at the preset position that is in the target background template and that matches each human body portrait includes: performing scaling processing on each human body portrait based on the distance between the imaging object corresponding to the preset position and the optical center of the target camera along the principal optical axis direction of the target camera; and placing each human body portrait on which the scaling processing is performed on the preset position that is in the target background template and that matches each human body portrait.

In some scenarios, the human body portrait is a two-dimensional image. It is assumed that pixel coordinates of a pixel P in the human body portrait are $(x, y)$, and scaling processing is performed on the pixel coordinates of the pixel P by using a scaling factor s, so that pixel coordinates of a pixel P' corresponding to the pixel P in the human body portrait on which the scaling processing is performed are $(sx, sy)$. $s=w/h$, and $w=m*f/(d1*p)$. h is an original pixel height of a human body portrait, and a unit is a quantity of pixels. m is a preset human body height, and a unit is meter. f is a focal length of a target camera, and p is a pixel size of the target camera. d1 is a distance between the imaging object corresponding to the preset position matching the human body portrait and the optical center of the target camera along the principal optical axis direction of the target camera.

In some other scenarios, the human body portrait is a three-dimensional image. When the human body portrait is a three-dimensional image, a point cloud may be used to represent the human body portrait. It is assumed that coordinates of a three-dimensional point Q in the point cloud are $(X, Y, Z)$, and scaling processing is performed on the coordinates of the three-dimensional point Q by using a scaling factor s, so that coordinates of a three-dimensional point Q' corresponding to the three-dimensional point Q in the human body portrait on which the scaling processing is performed are $(X, Y, Z_s)$. $Z_s=Z+(d2-s)$, and s is an average value or a median value of depth information in the point cloud. d2 is a distance between the imaging object corresponding to the preset position matching the human body portrait and the optical center of the target camera along the principal optical axis direction of the target camera.

When the human body portrait is a two-dimensional image, after scaling processing is performed on the human body portrait, the human body portrait on which the scaling processing is performed is directly placed at a preset position that is in the target background template and that matches the human body portrait. When the human body portrait is a three-dimensional image, after scaling processing is performed on the human body portrait, projection transformation is performed on the human body portrait on which the scaling processing is performed by using a camera parameter of the target camera, to obtain a two-dimensional image, and then the two-dimensional image is placed at a preset position that is in the target background template and that matches each human body portrait.

In a second implementation, the target template information of the target background template includes size information of the preset position in the target background template. An implementation process of placing the human body portrait at a preset position that is in the target background template and that matches each human body portrait includes: performing, based on an original size of the human body portrait and a size of the preset position matching the human body portrait, scaling processing on the human body portrait, so that a target size of the human body portrait on which the scaling processing is performed matches the size of the preset position matching the human body portrait, and then placing the human body portrait on which the scaling processing is performed at a preset position that is in the target background template and that matches the human body portrait.

Optionally, an implementation process of obtaining one or more human body portraits in at least one image and human body description information of each human body portrait includes: performing instance segmentation on the image to obtain each human body portrait in the image; and performing posture estimation on each human body portrait to obtain the human body description information of each human body portrait.

The instance segmentation in this application may be human body instance segmentation, and used to segment a complete human body portrait in an image or segment an upper body of a human body portrait in an image.

Optionally, if the obtained image is a three-dimensional image, a human body portrait obtained by performing instance segmentation on the image is also a three-dimensional image. An implementation process of performing posture estimation on each human body portrait includes: performing three-dimensional posture estimation on each human body portrait.

Optionally, an implementation process of obtaining a target background template and target template information of the target background template includes: obtaining, based on the one or more human body portraits and the human body posture information of each human body portrait, the target background template and the target template information.

Optionally, an implementation process of obtaining, based on one or more human body portraits and the human body posture information of each human body portrait, the target background template and the target template information includes:

obtaining, based on the one or more human body portraits and the human body posture information of each human body portrait, a plurality of to-be-selected background templates and template information of the to-be-selected background templates, where the to-be-selected background template includes the preset position matching each human body portrait, and the template information includes the human body posture information associated with the preset position; displaying the plurality of to-be-selected background templates; and determining, in response to a selection instruction for a first to-be-selected background template in the plurality of to-be-selected background templates, the first to-be-selected background template as the target background template, and determining template information of the first to-be-selected background template as the target template information.

In this application, when the terminal or the central control platform obtains a plurality of to-be-selected background templates based on the human body portrait and the human body posture information of the human body portrait, the plurality of to-be-selected background templates may be displayed on a display interface for a user to select, thereby improving user experience.

Optionally, after obtaining the synthesized image, the terminal displays the synthesized image and a background adjustment control, where the background adjustment control is configured to adjust a background of the synthesized image. Optionally, the background adjustment control includes one or more of a brightness adjustment control, a contrast adjustment control, a zoom control, or a rotation direction adjustment control.

Optionally, in response to a control instruction for the background adjustment control, the background of the synthesized image is adjusted based on the control instruction.

In this application, the synthesized image and the background adjustment control for the synthesized image are displayed, so that the background of the synthesized image can be finely adjusted by operating the background adjustment control, thereby improving a visual effect and improving user experience.

Optionally, if the foregoing method is applied to the terminal, an implementation process in which the terminal obtains a human body portrait and human body description information of the human body portrait includes: receiving the human body portrait and the human body description information of the human body portrait that are sent by another terminal.

Optionally, if the foregoing method is applied to the central control platform, an implementation process in which the central control platform obtains a human body portrait and human body description information of the human body portrait includes: receiving the human body portrait and the human body description information of the human body portrait that are sent by the terminal.

Optionally, if the foregoing method is applied to a terminal, an implementation process in which the terminal obtains a target background template and target template information of the target background template includes: receiving the target background template and the target template information of the target background template that are sent by the central control platform; or receiving a plurality of to-be-selected background templates and template information of the to-be-selected background template that are sent by the central control platform, where the to-be-selected background template includes the preset position matching the human body portrait, and the template information includes the human body posture information associated with the preset position; displaying the plurality of to-beselected background templates; and determining, in response to a selection instruction for a first to-be-selected background template in the plurality of to-be-selected background templates, the first to-be-selected background template as the target background template, and determining template information of the first to-be-selected background template as the target template information.

According to a second aspect, an image generation apparatus is provided. The apparatus includes a plurality of functional modules. The plurality of functional modules interact with each other to implement the method according to the first aspect and the implementations of the first aspect. The plurality of functional modules may be implemented based on software, hardware, or a combination of software and hardware, and the plurality of functional modules may be randomly combined or divided based on a specific implementation.

According to a third aspect, an image generation apparatus is provided, including a processor and a memory, where
the memory is configured to store a computer program, and the computer program includes program instructions; and
the processor is configured to invoke the computer program to implement the method according to the first aspect and the implementations of the first aspect.

According to a fourth aspect, an image generation system is provided, including a first terminal and a second terminal, where
the first terminal is configured to perform instance segmentation on a first image to obtain a human body portrait in the first image, and perform posture estimation on the human body portrait to obtain human body description information of the human body portrait, where the human body description information includes human body posture information, and the first image is collected by the first terminal, or the first image is collected by an image collection device connected to the first terminal;
the first terminal is further configured to send the human body portrait in the first image and the human body description information of the human body portrait to the second terminal;
the second terminal is configured to obtain, based on one or more human body portraits and human body posture information of each human body portrait, a target background template and target template information of the target background template, where the one or more human body portraits include the human body portrait in the first image, the target background template includes a preset position matching each human body portrait, and the target template information includes human body posture information associated with the preset position;
the second terminal is further configured to place, based on the human body description information and the target template information, each human body portrait at the preset position that is in the target background template and that matches each human body portrait, to obtain a synthesized image; and
the second terminal is further configured to display the synthesized image.

Optionally, the one or more human body portraits further include a human body portrait in a second image, and the second image is collected by the second terminal, or the second image is collected by an image collection device connected to the second terminal; and the second terminal is further configured to perform instance segmentation on the second image to obtain the human body portrait in the second image, and perform posture estimation on the human body portrait to obtain human body description information of the human body portrait.

According to a fifth aspect, another image generation system is provided, including a first terminal and a second terminal, where the first terminal is configured to perform instance segmentation on a first image to obtain a human body portrait in the first image, and perform posture estimation on the human body portrait to obtain human body description information of the human body portrait, where the human body description information includes human body posture information, and the first image is collected by the first terminal, or the first image is collected by an image collection device connected to the first terminal;

the first terminal is further configured to obtain, based on the human body portrait and the human body posture information of the human body portrait, a target background template and target template information of the target background template, where the target background template includes a preset position matching the human body portrait, and the target template information includes human body posture information associated with the preset position;

the first terminal is further configured to place, based on the human body description information and the target template information, the human body portrait at the preset position that is in the target background template and that matches the human body portrait, to obtain a synthesized image;

the first terminal is further configured to send the synthesized image to the second terminal; and the second terminal is configured to display the synthesized image.

According to a sixth aspect, still another image generation system is provided, including a central control platform and a plurality of terminals, where the terminal is configured to perform instance segmentation on an image to obtain a human body portrait in the image, and perform posture estimation on the human body portrait to obtain human body description information of the human body portrait, where the human body description information includes human body posture information, and the image is collected by the terminal, or the image is collected by an image collection device connected to the terminal;

the terminal is further configured to send the human body portrait and the human body description information of the human body portrait to the central control platform;

the central control platform is configured to obtain, based on the human body portrait and the human body posture information of the human body portrait from each of the plurality of terminals, a target background template and target template information of the target background template, where the target background template includes a preset position matching each human body portrait, and the target template information includes human body posture information associated with the preset position;

the central control platform is further configured to place, based on the human body description information and the target template information, each human body portrait at the preset position that is in the target background template and that matches each human body portrait, to obtain a synthesized image;

the central control platform is further configured to send the synthesized image to the plurality of terminals respectively; and the terminal is further configured to display the synthesized image.

According to a seventh aspect, yet another image generation system is provided, including a central control platform and a plurality of terminals, where the terminal is configured to send an image to the central control platform, where the image is obtained by collection of the terminal, or the image is obtained by collection of an image collection device connected to the terminal;

the central control platform is configured to separately perform instance segmentation on a plurality of images from the plurality of terminals to obtain human body portraits in the plurality of images, and perform posture estimation on each human body portrait to obtain human body description information of each human body portrait, where the human body description information includes human body posture information;

the central control platform is further configured to obtain, based on each human body portrait and the human body posture information of each human body portrait, a target background template and target template information of the target background template, where the target background template includes a preset position matching each human body portrait, and the target template information includes human body posture information associated with the preset position;

the central control platform is further configured to place, based on the human body description information and the target template information, each human body portrait at the preset position that is in the target background template and that matches each human body portrait, to obtain a synthesized image;

the central control platform is further configured to send the synthesized image to the plurality of terminals respectively; and the terminal is further configured to display the synthesized image.

According to an eighth aspect, a computer-readable storage medium is provided, where the computer-readable storage medium stores instructions, and when the instructions are executed by a processor, the method in the first aspect and the implementations of the first aspect is implemented.

According to a ninth aspect, a chip is provided. The chip includes a programmable logic circuit and/or program instructions. When the chip runs, the method in the first aspect and the implementations of the first aspect is implemented.

BRIEF DESCRIPTION OF DRAWINGS

FIG. 19 is a schematic flowchart of another image generation method according to an embodiment of this application;

DESCRIPTION OF EMBODIMENTS

To make the objectives, technical solutions, and advantages of this application clearer, the following further describes the implementations of this application in detail with reference to the accompanying drawings.

In a modern conference system, with the increasing cross-region collaboration and the cost requirement, a demand for a video conference is increasing. To protect the privacy of an environment in which a user is located, a real background in a video conference image needs to be replaced with a virtual background. Further, people in different conference rooms are placed in a same virtual background, so that a plurality of participants feel like working together, thereby improving a multi-person collaboration atmosphere.

In a video conference scenario, a camera angle of view and a posture of a participant are complex. For example, the participant may be standing or sitting, and the sitting participant may face the camera directly, or may face the camera sideways, or may face away from the camera. Therefore, after a video conference image collected by the camera is segmented to obtain a human body portrait, the human body portrait is directly fused into the virtual background, and a problem that the human body portrait does not match the virtual background may occur, which leads to a clear sense of inconsistency. Especially, when people in different conference rooms are placed in the same virtual background, the inconsistency caused by mismatch between the human body portrait and the virtual background are more obvious.

In view of this, an embodiment of this application provides an image generation method. A preset position associated with human body posture information is preconfigured in a background template. When a background of an image is changed, a human body portrait is placed, based on the human body posture information of the human body portrait in the image, at the preset position that is in the background template and that matches the human body portrait, so that the human body portrait matches the background template, thereby achieving a good imaging effect of a synthesized image.

The following describes in detail the technical solutions provided in this application from a plurality of perspectives such as an application scenario, a method procedure, a software apparatus, and a hardware apparatus.

The following describes an application scenario of embodiments of this application by using an example.

Figure 1:
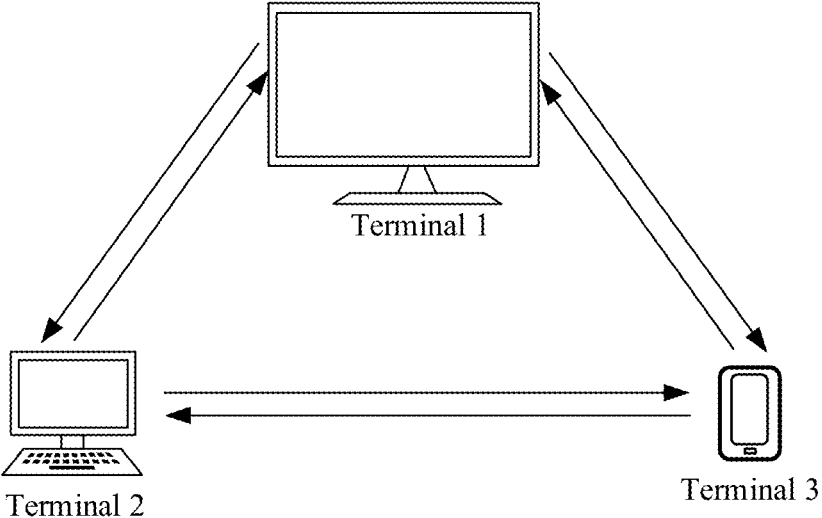
FIG. 1 is a schematic diagram of an application scenario of an image generation method according to an embodiment of this application.

For example, FIG. 1 is a schematic diagram of an application scenario of an image generation method according to an embodiment of this application. As shown in FIG. 1, the application scenario includes a plurality of terminals. A communication connection is established between every two of the plurality of terminals. An example in which the application scenario shown in FIG. 1 includes three terminals (terminals 1 to 3) is used. An actual scenario may further include two terminals, four terminals, or more terminals. A quantity of terminals included in the application scenario is not limited in this embodiment of this application.

Optionally, an image collection device is integrated in the terminal, or the terminal is connected to the image collection device.

The terminal is configured to display an image or play a video stream. Optionally, the terminal is an electronic device that has a display function and an image processing function, such as a large screen, an electronic whiteboard, a mobile phone, a tablet computer, or an intelligent wearable device.

The image collection device is configured to collect a video stream. Optionally, if the image collection device includes a color camera, an image (a video frame) in the video stream collected by the image collection device is an RGB image (a color image). Alternatively, the image collection device includes a depth camera and a color camera. The depth camera is configured to collect a depth image, and the color camera is configured to collect an RGB image. In this case, an image in the video stream collected by the image acquisition device is an RGB image (RGB-D image for short) having depth information. Alternatively, the image collection device is a binocular camera, and the binocular camera includes two common cameras (that is, the binocular camera has two cameras). In this case, an image in the video stream collected by the image collection device is a three-dimensional image. If the binocular camera includes a color camera and a black-and-white camera, or the binocular camera includes two color cameras, an image collected by the binocular camera is an RGB-D image. The RGB image is a two-dimensional image, and the RGB-D image is a three-dimensional image.

Figure 2:
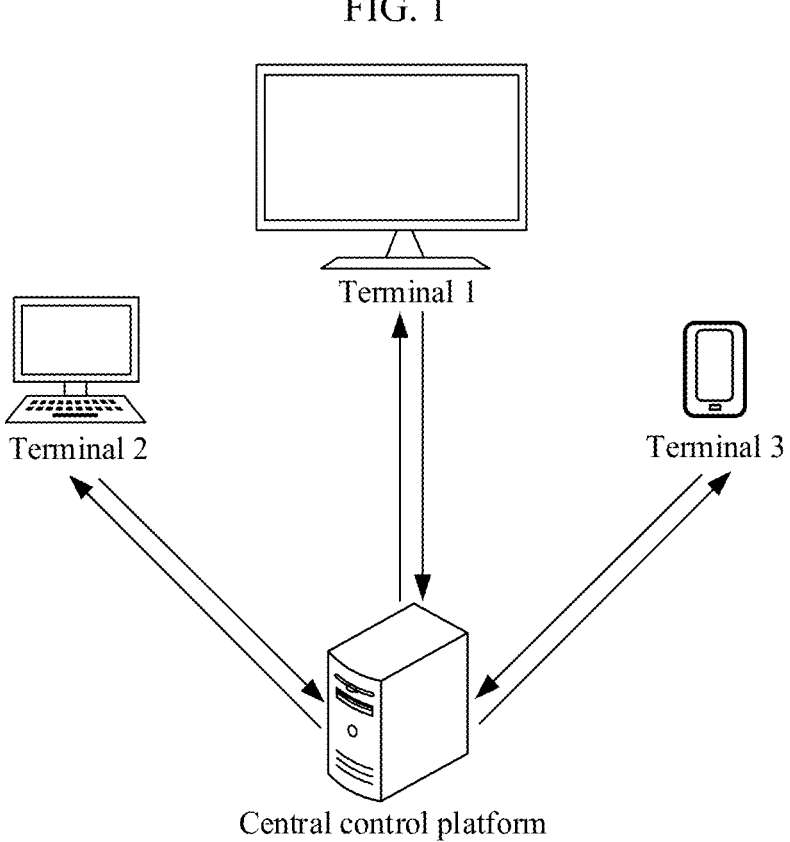
FIG. 2 is a schematic diagram of an application scenario of another image generation method according to an embodiment of this application.

For another example, FIG. 2 is a schematic diagram of an application scenario of another image generation method according to an embodiment of this application. Different from the application scenario shown in FIG. 1, the application scenario shown in FIG. 2 further includes a central control platform. As shown in FIG. 2, the application scenario includes a central control platform and a plurality of terminals. Each terminal communicates with the central control platform. The central control platform refers to a control platform that can control and manage a plurality of terminals.

The terminal in FIG. 2 is similar to the terminal in FIG. 1. For details, refer to the foregoing description of the terminal in FIG. 1. Details are not described herein again. The central control platform may be a server, a server cluster including several servers, or a cloud computing center.

The image generation method provided in this embodiment of this application can be applied to a video communication scenario such as a video conference or a video chat, and may be further applied to another scenario having an image background change requirement. A type of an application scenario is not limited in this embodiment of this application.

The following describes a method procedure in embodiments of this application by using an example.

Figure 3:
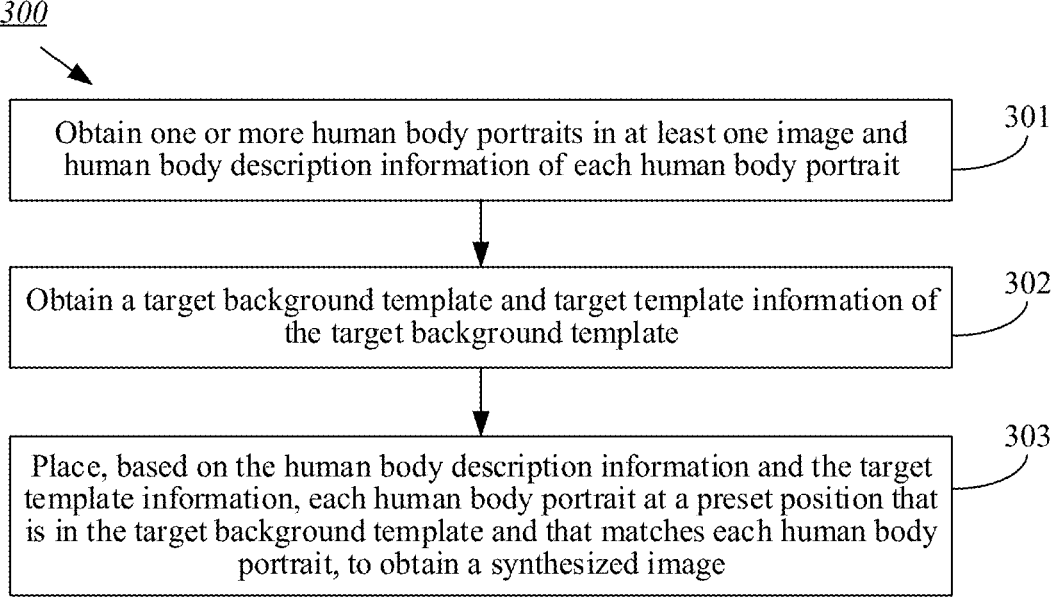
FIG. 3 is a schematic flowchart of an image generation method according to an embodiment of this application.

FIG. 3 is a schematic flowchart of an image generation method 300 according to an embodiment of this application. As shown in FIG. 3, the method 300 includes the following step 301 to step 303.

Optionally, an application scenario on which the method 300 is based is shown in FIG. 1. The method 300 is applied to any terminal in FIG. 1. Alternatively, an application scenario on which the method 300 is based is shown in FIG. 2. The method 300 is applied to any terminal or central control platform in FIG. 2.

Optionally, an application scenario on which the method 300 is based is shown in FIG. 1 or FIG. 2. At least one image in the method 300 is from at least one terminal. For example, the method 300 is applied to the terminal 1, and at least one image in the method 300 is from the terminal 1, the terminal 2, and/or the terminal 3. If the at least one image in the method 300 includes a plurality of images, the plurality of images are respectively from a plurality of terminals. Optionally, a collection moment of the plurality of images is the same.

Step 301: Obtain one or more human body portraits in at least one image and human body description information of each human body portrait.

The human body description information includes human body posture information. Optionally, the human body posture information includes a human body deflection angle (yaw) and/or a human body posture. That is, the human body posture information may include a human body deflection angle, or the human body posture information includes a human body posture, or the human body posture information includes a human body deflection angle and a human body posture.

Figure 4:
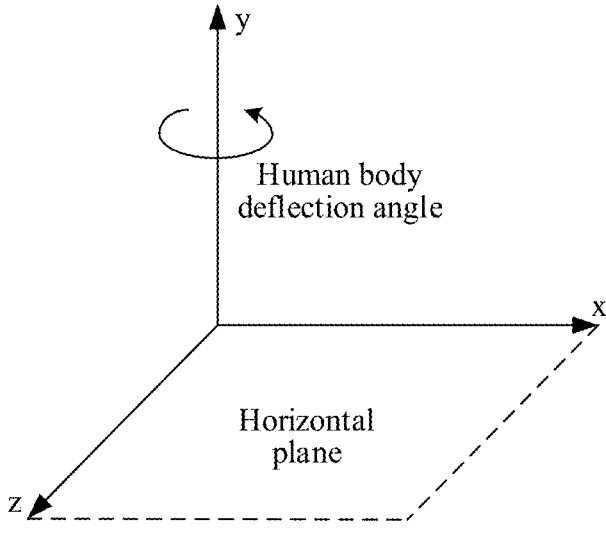
FIG. 4 is a schematic diagram of a spatial coordinate system according to an embodiment of this application.

The human body deflection angle is an angle at which a human body rotates in a direction perpendicular to a horizontal plane. For example, FIG. 4 is a schematic diagram of a spatial coordinate system according to an embodiment of this application. As shown in FIG. 4, an x-axis and a z-axis are located on the horizontal plane, a y-axis is perpendicular to the horizontal plane, and the human body deflection angle is an angle at which the human body rotates along the y-axis. In this embodiment of this application, if the human body deflection angle is 0°, it indicates that the human body faces an image collection device for collecting a human body image corresponding to the human body directly; if the human body deflection angle is 180°, it indicates that the human body faces away from an image collection device for collecting a human body image corresponding to the human body; if the human body deflection angle is a positive value (0° to 180°), it indicates that the human body faces an image collection device for collecting a human body image corresponding to the human body and turns right; and if the human body deflection angle is a negative value (0° to −180°), it indicates that the human body faces an image collection device for collecting a human body image corresponding to the human body and turns left. Optionally, the human body posture is standing, sitting, lying, crouching, or the like. In this embodiment of this application, the human body posture is used to describe that a person is in a state such as standing, sitting, lying, or crouching.

In this embodiment of this application, a human body portrait obtained from an image may be a complete human body portrait in the image. In this case, a human body posture of the obtained human body portrait may be standing, sitting, or the like. Alternatively, the human body portrait obtained from the image may include only an upper body of the human body portrait in the image. In this case, the upper body of the human body portrait in which the human body posture is standing in the image may be considered as a human body portrait in which the human body posture is sitting.

Figure 5:
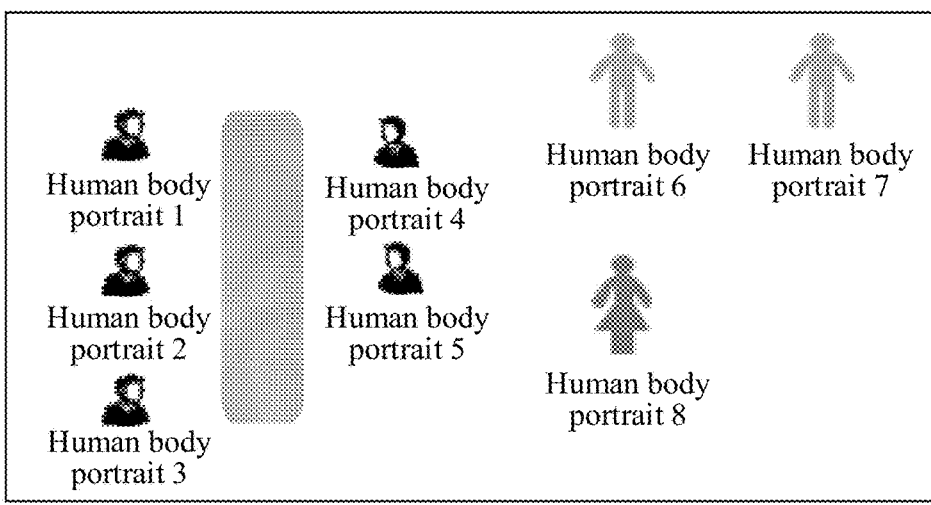
FIG. 5 is a schematic diagram of an image according to an embodiment of this application.

For example, FIG. 5 is a schematic diagram of an image according to an embodiment of this application. As shown in FIG. 5, the image includes eight human body portraits. A human body posture of a human body portrait 1 to 3 is sitting, and a human body deflection angle is 45°; a human body posture of a human body portrait 4 to 5 is sitting, and a human body deflection angle is −45°; and a human body posture of a human body portrait 6 to 8 is standing, and a human body deflection angle is 0°.

Figure 6:
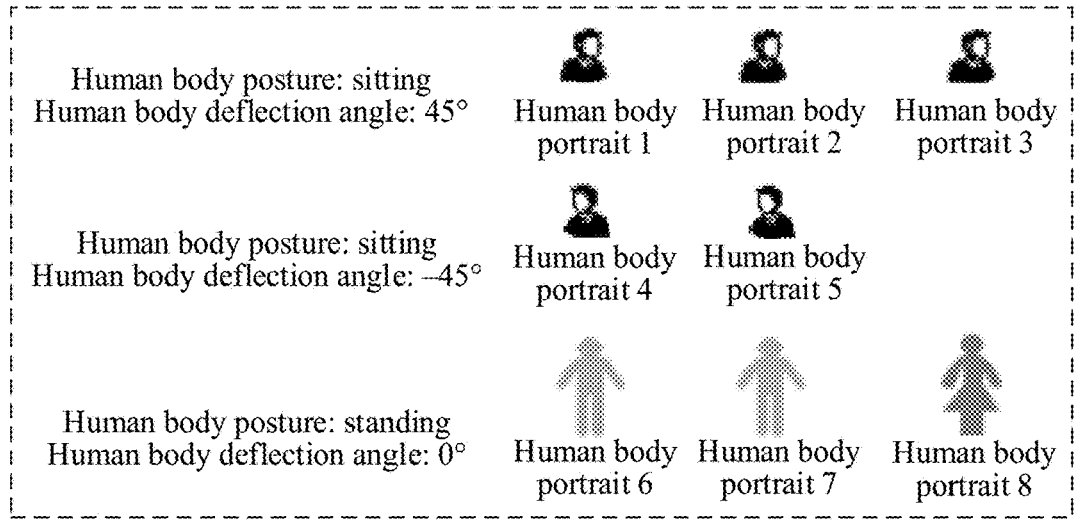
FIG. 6 is a schematic diagram of a human body portrait obtained based on the image shown in FIG. 5 according to an embodiment of this application.

In a first implementation, a complete human body portrait in the image shown in FIG. 5 is obtained, and the obtained human body portrait 1 to 8 may be shown in FIG. 6. Human body description information of the human body portrait 1 to 8 separately includes: the human body posture of the human body portrait 1 to 3 is sitting, and the human body deflection angle is 45°; the human body posture of the human body portrait 4 to 5 is sitting, and the human body deflection angle is −45°; and the human body posture of the human body portrait 6 to 8 is standing, and the human body deflection angle is 0°.

Figure 7:
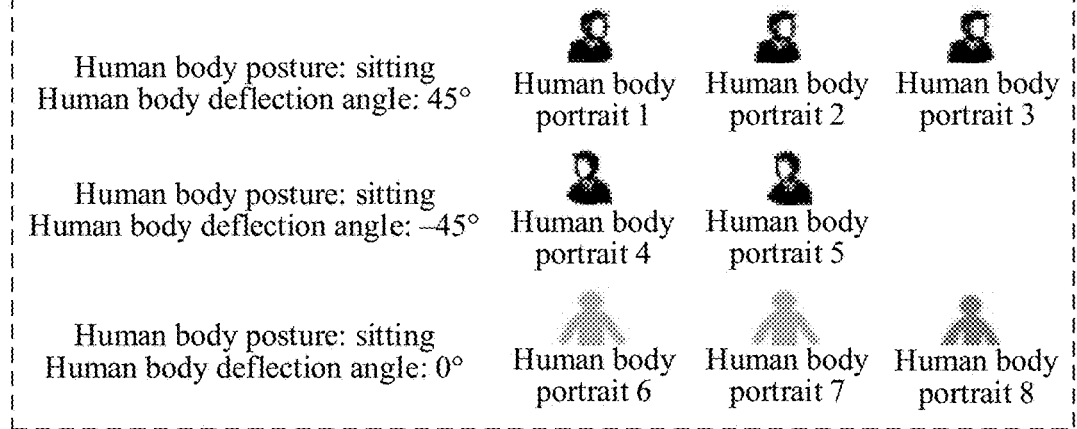
FIG. 7 is a schematic diagram of another human body portrait obtained based on the image shown in FIG. 5 according to an embodiment of this application.

In a second implementation, the upper body of the human body portrait in the image shown in FIG. 5 is obtained, and the obtained human body portrait 1 to 8 may be shown in FIG. 7. The human body description information of the human body portrait 1 to 8 separately includes: the human body posture of the human body portrait 1 to 3 is sitting, and the human body deflection angle is 45°; the human body posture of the human body portrait 4 to 5 is sitting, and the human body deflection angle is −45°; and the human body posture of the human body portrait 6 to 8 is sitting, and the human body deflection angle is 0°.

Optionally, the human body description information further includes a first location indication of a human body key point in the human body portrait. The first location indication of the human body key point in the human body portrait may be, for example, pixel coordinates of the human body key point in the human body portrait. The human body key point may be a human body bone point, including one or more of a head, a shoulder, a wrist, an elbow, a hip, a knee, or an ankle.

Optionally, an implementation process of obtaining the human body portrait in the image and the human body description information of the human body portrait includes the following step 3011 to step 3012.

In step 3011, instance segmentation is performed on the image to obtain a human body portrait in the image.

Optionally, a human body mask is obtained by performing instance segmentation on the image, and then the human body portrait in the image is obtained based on the human body mask and the image. For example, instance segmentation is performed on the image shown in FIG. 5, to obtain a human body portrait shown in FIG. 6 or FIG. 7. In this embodiment of this application, the instance segmentation refers to human body instance segmentation.

In step 3012, posture estimation is performed on the human body portrait to obtain human body description information of the human body portrait.

Optionally, posture estimation is performed on the human body portrait to obtain locations of a plurality of human body key points in the human body portrait, and then a human body posture and/or a human body deflection angle of the human body portrait are/is determined based on a location relationship between the plurality of human body key points, to obtain human body posture information.

Figure 8:
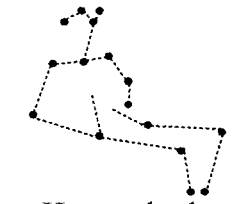
FIG. 8 is a schematic diagram of a human body key point according to an embodiment of this application.
Figure 9:
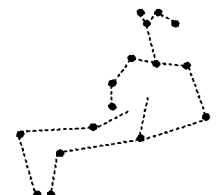
FIG. 9 is a schematic diagram of another human body key point according to an embodiment of this application.
Figure 10:
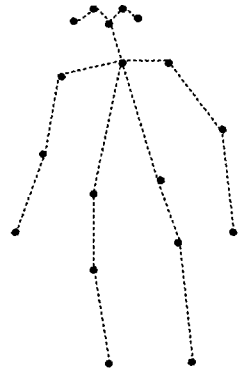
FIG. 10 is a schematic diagram of still another human body key point according to an embodiment of this application.
Figure 11:
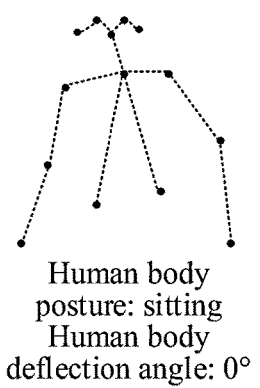
FIG. 11 is a schematic diagram of still another human body key point according to an embodiment of this application.

For example, a human body key point shown in FIG. 8 may be obtained by performing posture estimation on a human body portrait with a human body posture of sitting and a human body deflection angle of 45°; a human body key point shown in FIG. 9 may be obtained by performing posture estimation on a human body portrait with a human body posture of sitting and a human body deflection angle of −45°; a human body key point shown in FIG. 10 may be obtained by performing posture estimation on a human body portrait with a human body posture of standing and a human body deflection angle of 0°; and a human body key point shown in FIG. 11 may be obtained by performing posture estimation on a human body portrait with a human body posture of sitting and a human body deflection angle of 0°.

Optionally, the foregoing image is a two-dimensional image, and the human body portrait obtained by performing instance segmentation on the image is also a two-dimensional image. An implementation process of step 3012 includes: performing two-dimensional posture estimation on the human body portrait to obtain the human body description information of the human body portrait. Alternatively, the foregoing image is a three-dimensional image, and the human body portrait obtained by performing instance segmentation on the image is also a three-dimensional image. An implementation process of step 3012 includes: performing three-dimensional posture estimation on the human body portrait to obtain the human body description information of the human body portrait.

In this embodiment of this application, a terminal or an image collection device connected to the terminal collects a three-dimensional image, the terminal or a central control platform performs instance segmentation on the three-dimensional image to obtain a human body portrait, and performs three-dimensional posture estimation on the human body portrait to obtain the human body posture information of the human body portrait. Compared with a two-dimensional image, instance segmentation and posture estimation performed on a three-dimensional image are more accurate.

Step 302: Obtain a target background template and target template information of the target background template.

The target background template includes a preset position that matches the one or more obtained human body portraits. The target template information includes human body posture information associated with a preset position in the target background template. If the human body posture information associated with the preset position in the background template matches the human body posture information of the human body portrait, it is determined that the preset position matches the human body portrait. In this embodiment of this application, a preset position in the background template is used to place a human body portrait, and a quantity of each preset position in the target background template is not less than a quantity of obtained human body portraits that match the preset position. For example, if the obtained human body portrait includes three human body portraits with a human body posture of sitting and a human body deflection angle of 45°, the target background template should meet the following condition: Three or more preset positions configured to place the human body portraits with a human body posture of sitting and a human body deflection angle of 45° are included, that is, three or more preset positions are associated with the human body posture information "a human body posture of sitting and a human body deflection angle of 45°".

Figure 12:
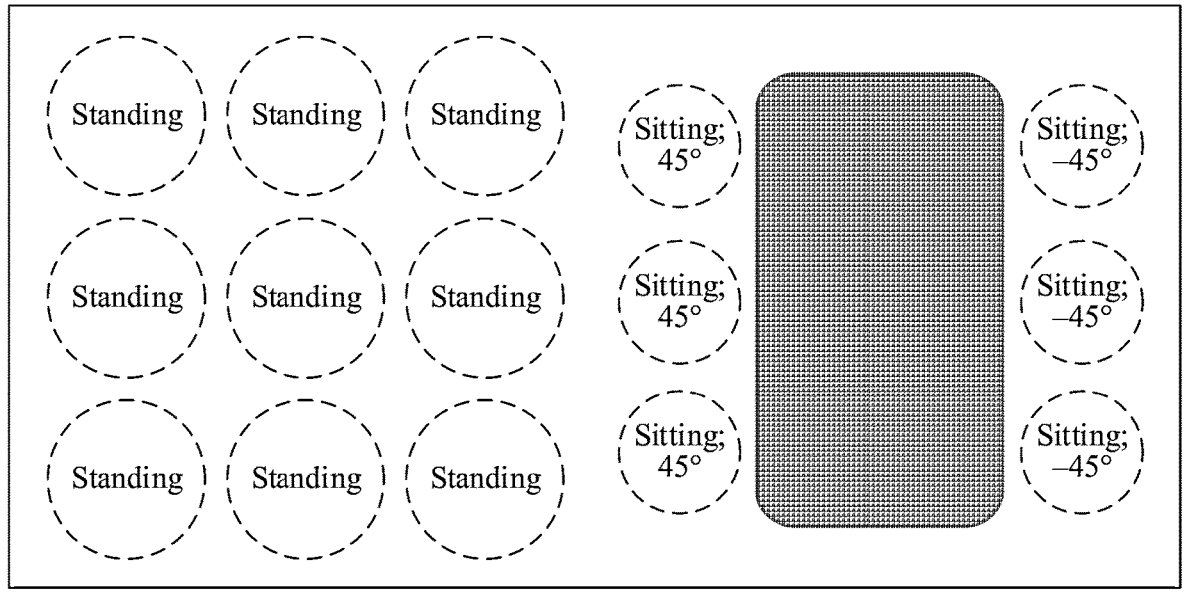
FIG. 12 is a schematic diagram of a background template according to an embodiment of this application.

For example, FIG. 12 is a schematic diagram of a background template according to an embodiment of this application. As shown in FIG. 12, the background template includes 15 preset positions. Three preset positions are configured to place a human body portrait with a human body posture of sitting and a human body deflection angle of 45°; three preset positions are configured to place a human body portrait with a human body posture of sitting and a human body deflection angle of −45°; and nine preset positions are configured to place a human body portrait with a human body posture of standing.

In the background template provided in this embodiment of this application, for a preset position that is configured to place a human body portrait with a human body posture of standing, a human body deflection angle associated with the preset position may not be limited, so that a human body portrait with any human body deflection angle and a human body posture of standing may be placed in the preset position, to expand an application scope of the background template. Certainly, in this embodiment of this application, a solution in which the preset position is associated with a human body deflection angle is not excluded.

Figure 13:
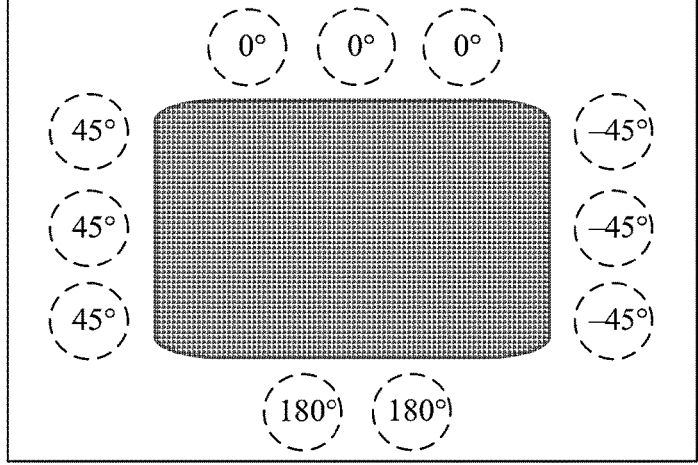
FIG. 13 is a schematic diagram of another background template according to an embodiment of this application.

For another example, FIG. 13 is a schematic diagram of another background template according to an embodiment of this application. As shown in FIG. 13, the background template includes 11 preset positions, and the 11 preset positions are all configured to place a human body portrait with a human body posture of sitting. Three preset positions are configured to place a human body portrait with a human body deflection angle of 45°; three preset positions are configured to place a human body portrait with a human body deflection angle of −45°; three preset positions are configured to place a human body portrait with a human body deflection angle of 0°; and two preset positions are configured to place a human body portrait with a human body deflection angle of 180°.

Figure 14:
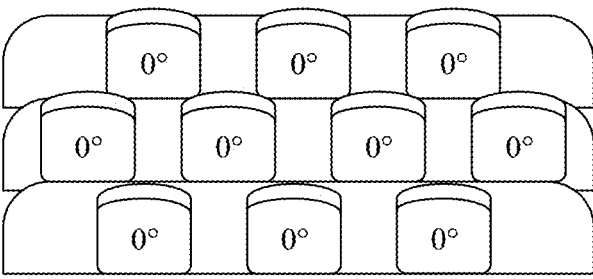
FIG. 14 is a schematic diagram of still another background template according to an embodiment of this application.

For another example, FIG. 14 is a schematic diagram of still another background template according to an embodiment of this application. As shown in FIG. 14, the background template includes 10 preset positions, and the 10 preset positions are all configured to place a human body portrait with a human body posture of sitting and a human body deflection angle of 0°.

In this embodiment of this application, for a background template in which all included preset positions are configured to place a human body portrait with a human body posture of sitting, for example, the background template shown in FIG. 13 or FIG. 14, template information of the background template may include an indication that the background template is associated with "a human body posture of sitting". In the template information of the background template, the human body posture information associated with the preset position may include only a human body deflection angle.

If the human body portrait obtained in step 302 is shown in FIG. 6, the target background template obtained in step 303 may be the background template shown in FIG. 12. If the human body portrait obtained in step 302 is shown in FIG. 7, the target background template obtained in step 303 may be the background template shown in FIG. 13.

Optionally, the target background template is a wide-angle picture, that is, a horizontal angle of view of the target background template is greater than a horizontal photographing angle of view of the target camera, and/or a vertical angle of view of the target background template is greater than a vertical photographing angle of view of the target camera.

In this embodiment of this application, the target camera is a camera corresponding to the target background template. It may be understood that the target background template is obtained by shooting by the target camera, that is, the target camera is a real camera, and the target background template is a real scene portrait; or the target background template is obtained by simulating shooting by the target camera, that is, the target camera is a virtual camera, and the target background template is a constructed virtual scene portrait. Regardless of whether the target camera is a real camera or a virtual camera, a camera parameter of the target camera always refers to a camera parameter used for shooting the target background template.

Optionally, the target template information further includes a second location indication for a human body key region at a preset position in the target background template. The human body key region refers to a region in which the human body key point is located. The second location indication of the human body key region at the preset position may include, for example, pixel coordinates of a center of the human body key region and a size of the human body key region, or may include a pixel range of the human body key region. In this embodiment of this application, the human body key region on the preset position may include a region in which a human body key point on a human body torso is located, for example, includes a hip region, used to match a hip of the human body.

Step 303: Place, based on the human body description information and the target template information, each human body portrait at a preset position that is in the target background template and that matches each human body portrait, to obtain a synthesized image.

Figure 15:
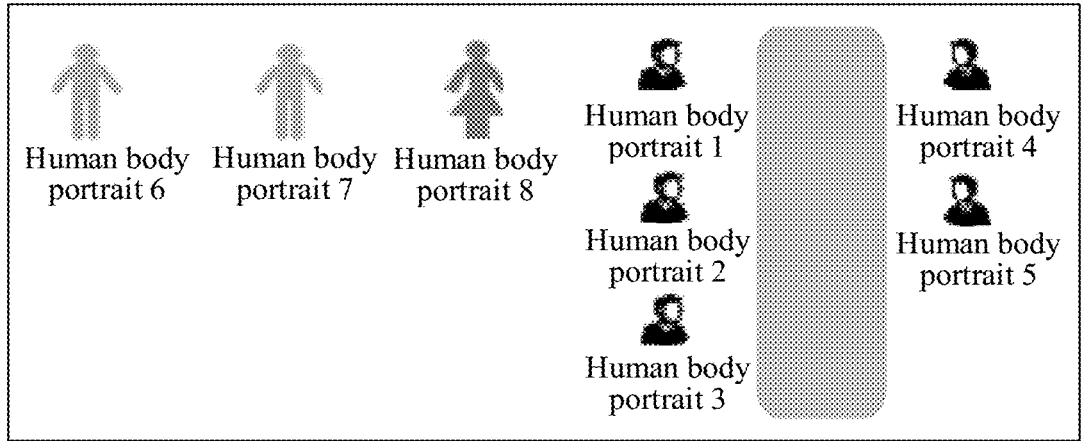
FIG. 15 is a schematic diagram of a synthesized image according to an embodiment of this application.
Figure 16:
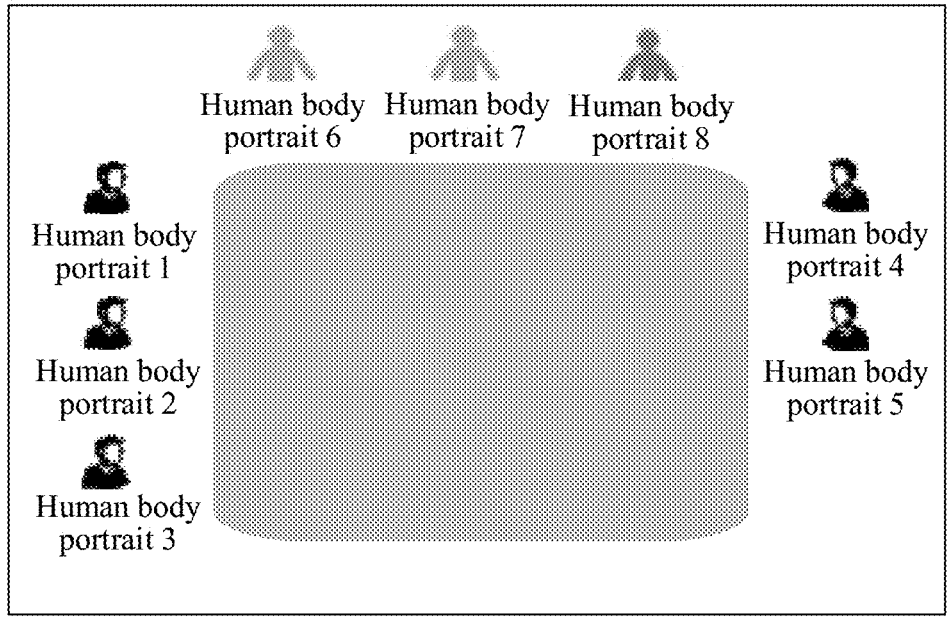
FIG. 16 is a schematic diagram of another synthesized image according to an embodiment of this application.

For example, each human body portrait shown in FIG. 6 is placed on a preset position that matches each human body portrait in the background template shown in FIG. 12, to obtain a synthesized image shown in FIG. 15. For another example, each human body portrait shown in FIG. 7 is placed on a preset position that matches each human body portrait in the background template shown in FIG. 13, to obtain a synthesized image shown in FIG. 16.

Optionally, when the human body description information includes the first location indication for the human body key point in the human body portrait, and the target template information includes the second location indication for the human body key region at the preset position in the target background template, an implementation process of step 303 may include: arranging, based on the first location indication and the second location indication, the human body key point in each human body portrait into the human body key region corresponding to the preset position that is in the target background template and that matches each human body portrait.

If a size of the human body portrait matches a size of the preset position, after some human body key points in the human body portrait are arranged in the human body key region corresponding to the preset position, the human body portrait can better match the preset position as a whole. For example, a human body key point in a human body portrait with a human body posture of sitting includes a hip, and a human body key region in a preset position includes a hip region. By arranging both a left hip and a right hip in the human body portrait in the hip region in the preset position, the human body portrait can be more accurately attached to the preset position.

The size of the human body portrait refers to an imaging area or an imaging height of the human body portrait. Correspondingly, the size of the preset position refers to an area of the preset position or a height of the preset position.

In this embodiment of this application, the human body key point in the human body portrait is arranged in a human body key point region corresponding to a preset position that is in the target background template and that matches the human body portrait, so that a fusion effect of the human body portrait and the target background template can be improved, thereby improving an imaging effect of the synthesized image.

Optionally, the one or more human body portraits obtained in step 301 include a first human body portrait and a second human body portrait that have same human body posture information, and an original size of the first human body portrait is greater than an original size of the second human body portrait. A distance between a preset position at which the first human body portrait is located and a target camera is less than a distance between a preset position at which the second human body portrait is located and the target camera, and a target size of the first human body portrait in the synthesized image is greater than a target size of the second human body portrait. The original size of the human body portrait refers to a size of the human body portrait under an imaging plane of an original camera (a camera used to collect an image on which the human body portrait is located), and the target size of the human body portrait refers to a size of the human body portrait under an imaging plane of the target camera. The first human body portrait and the second human body portrait have a same form. For example, both the first human body portrait and the second human body portrait are upper body images or full body images.

In this embodiment of this application, when the human body portrait is arranged in the preset position of the background template, a principle of "near is large, and far is small" may be followed, so that a size of a human body portrait closer to the target camera in the synthesized image is larger, and a size of a human body portrait farther from the target camera is smaller, so that an imaging effect of the synthesized image is closer to a real image shot by a real camera. In addition, in a plurality of obtained human body portraits with the same human body posture information, a human body portrait with a larger size is arranged at a preset position closer to the target camera, and a human body portrait with a smaller size is arranged at a preset position farther away from the target camera. In this way, when a size of the human body portrait is adjusted, especially when the size of the human body portrait is enlarged, distortion degrees of the plurality of human body portraits can be unified, and when the human body portrait with a smaller size is arranged at a preset position closer to the target camera, a case in which an excessively large magnification multiple of the human body portrait causes a serious distortion degree of the human body portrait can be avoided, so that an imaging effect of the synthesized image is good.

Figure 17:
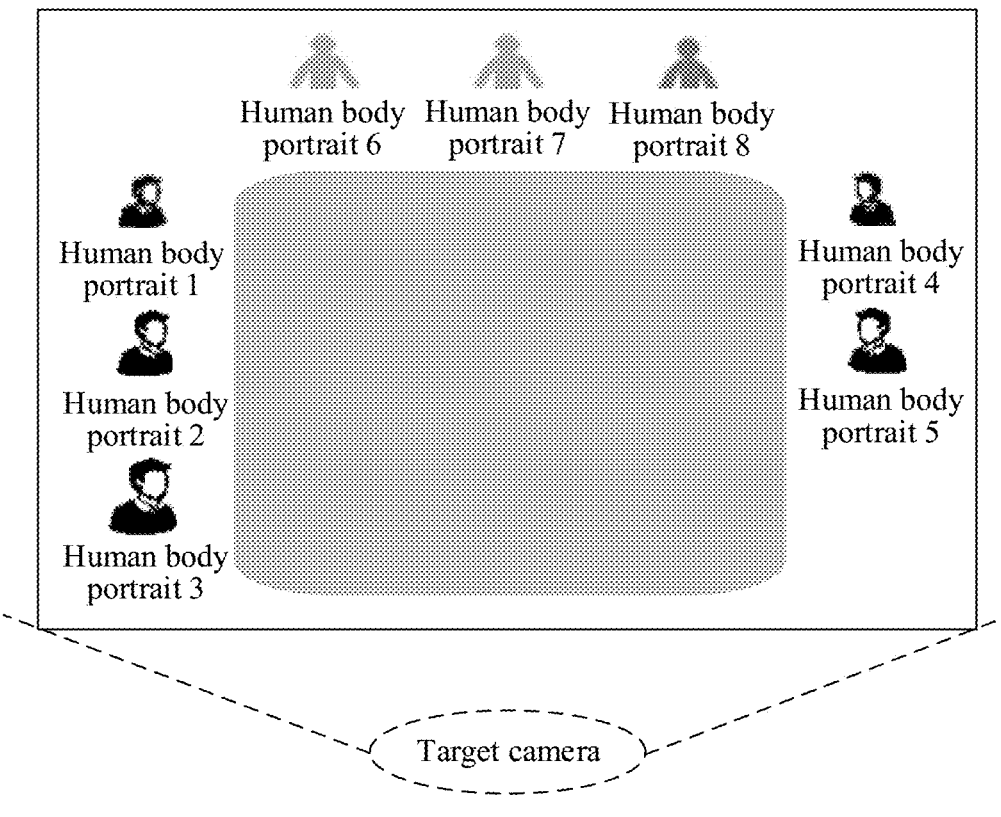
FIG. 17 is a schematic diagram of still another synthesized image according to an embodiment of this application.

For example, it is assumed that sizes of a human body portrait 1, a human body portrait 2, and a human body portrait 3 in FIG. 7 increase sequentially, and a size of a human body portrait 5 is greater than a size of a human body portrait 4. It is also assumed that three preset positions with a human body deflection angle of 45° in FIG. 13 gradually approach the preset position from top to bottom, and three preset positions with a human body deflection angle of −45° gradually approach the preset position from top to bottom. In this case, each human body portrait shown in FIG. 7 is placed on a preset position that matches each human body portrait in the background template shown in FIG. 13, and a synthesized image shown in FIG. 17 may be obtained.

Optionally, after the preset position that matches the human body portrait in the target background template is determined, this embodiment of this application provides the following two implementations, so that the target size of the human body portrait in the synthesized image matches the target background template.

In a first implementation, the target template information of the target background template includes a distance between an imaging object corresponding to a preset position in the target background template and an optical center of the target camera along a principal optical axis direction of the target camera and a camera parameter of the target camera. The distance between the imaging object corresponding to the preset position and the optical center of the target camera along the principal optical axis direction of the target camera may be a distance between a center of the imaging object corresponding to the preset position and the optical center of the target camera along the principal optical axis direction of the target camera. In this implementation, an implementation process of placing the human body portrait on a preset position that is in the target background template and that matches the human body portrait includes the following step 3031 to step 3032:

In step 3031, scaling processing is performed on the human body portrait based on a distance between the imaging object corresponding to the preset position and the optical center of the target camera along the principal optical axis direction of the target camera.

Figure 18:
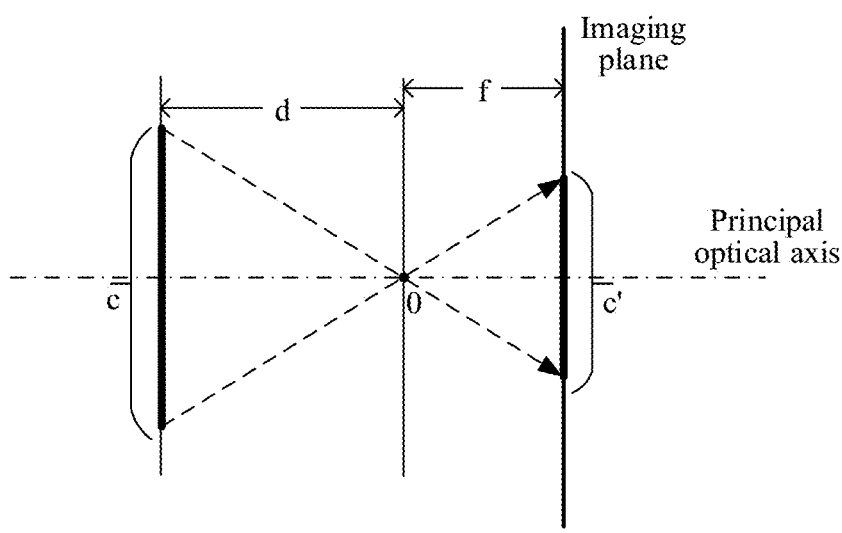
FIG. 18 is a schematic diagram of a model of a target camera according to an embodiment of this application.

For example, FIG. 18 is a schematic diagram of a model of a target camera according to an embodiment of this application. The target background template is on the imaging plane of the target camera. As shown in FIG. 18, a distance between the center of the imaging object c corresponding to the preset position c' and the optical center O of the target camera along the principal optical axis direction of the target camera is d, and a focal length of the target camera is f.

In step 3031, scaling processing is performed on the human body portrait, that is, scaling processing is performed on pixel coordinates of each pixel in the human body portrait.

In some scenarios, the human body portrait is a two-dimensional image. It is assumed that pixel coordinates of a pixel P in the human body portrait are (x, y), and scaling processing is performed on the pixel coordinates of the pixel P by using a scaling factor s, so that pixel coordinates of a pixel P' corresponding to the pixel P in the human body portrait on which the scaling processing is performed are (sx, sy). s=w/h, and w=m*f/(d1*p). h is an original pixel height of the human body portrait, that is, a pixel height of the human body portrait on an imaging plane of an original camera (a camera used to collect an image in which the human body portrait is located), and a unit is a quantity of pixels (pixels). m is a preset human body height, and a unit is meter. For example, a value of m may be 1.7 meters. f is a focal length of a target camera, and p is a pixel size of the target camera. d1 is a distance between the imaging object corresponding to the preset position matching the human body portrait and the optical center of the target camera along the principal optical axis direction of the target camera. w is actually a target pixel height of the human body portrait, that is, a pixel height of the human body portrait on an imaging plane of the target camera, and a unit is a quantity of pixels.

In some other scenarios, the human body portrait is a three-dimensional image. When the human body portrait is a three-dimensional image, a point cloud may be used to represent the human body portrait. It is assumed that coordinates of a three-dimensional point Q in the point cloud are (X, Y, Z), and scaling processing is performed on the coordinates of the three-dimensional point Q by using a scaling factor s, so that coordinates of a three-dimensional point Q' corresponding to the three-dimensional point Q in the human body portrait on which the scaling processing is performed are $(X, Y, Z_s)$. $Z_s$=Z+(d2−s), and s is an average value or a median value of depth information in the point cloud. d2 is a distance between the imaging object corresponding to the preset position matching the human body portrait and the optical center of the target camera along the principal optical axis direction of the target camera.

In step 3032, the human body portrait on which the scaling processing is performed is placed at the preset position that is in the target background template and that matches the human body portrait.

When the human body portrait is a two-dimensional image, after scaling processing is performed on the human body portrait, the human body portrait on which the scaling processing is performed is directly placed at a preset position that is in the target background template and that matches the human body portrait. When the human body portrait is a three-dimensional image, after scaling processing is performed on the human body portrait, projection transformation is performed on the human body portrait (three-dimensional image) on which the scaling processing is performed by using a camera parameter of the target camera, to obtain a two-dimensional image, and then the two-dimensional image is placed at a preset position that is in the target background template and that matches the human body portrait.

Optionally, the camera parameter of the target camera includes an intrinsic camera parameter and an extrinsic camera parameter.

The intrinsic camera parameter of the target camera may be represented as an intrinsic parameter matrix K:

$$K = \begin{bmatrix} f_x & 0 & c_x \\ 0 & f_y & c_y \\ 0 & 0 & 1 \end{bmatrix} \qquad \text{Formula (1)}$$

$f_x$ and $f_y$ represent a camera focal length of the target camera, and are related to a pixel size. $c_x$ represents an offset of the principal optical axis of the target camera on a horizontal coordinate of the image coordinate system corresponding to the target background template, that is, $c_x$ is a horizontal coordinate of the optical center of the target camera in the image coordinate system corresponding to the target background template, and is usually half of a width of the target background template. $c_y$ represents an offset of the principal optical axis of the target camera on a vertical coordinate of the image coordinate system corresponding to the target background template, that is, $c_y$ is a vertical coordinate of the optical center of the target camera in the image coordinate system corresponding to the target background template, and is usually half of a height of the target background template.

The extrinsic camera parameter of the target camera may be represented as an extrinsic parameter matrix T:

$$T=[R\ t] \qquad \text{Formula (2)}$$

R is a rotation matrix with three rows and three columns, and t is a translation matrix with three rows and one column. In this embodiment of this application, the rotation matrix R may be initialized to a unit matrix, and the translation matrix t may be initialized to an all-zero matrix.

The intrinsic parameter matrix K and the extrinsic parameter matrix T of the target camera together form a camera matrix W:

$$W=K\times T \qquad \text{Formula (3)}$$

The projection transformation is performed on the three-dimensional image by using the camera parameter of the target camera, to be specific, three-dimensional points in the three-dimensional image are converted into pixels on an imaging plane of the target camera by using the camera parameter of the target camera. It is assumed that homogenous coordinates of the three-dimensional point in the three-dimensional image are $P_w=(X_w, Y_w, Z_w, 1)$, and a pixel (u, v) corresponding to the three-dimensional point in the two-dimensional image may be obtained by using formula (4).

$$\begin{bmatrix} u \\ v \\ 1 \end{bmatrix} = W \times P_w^T \qquad \text{Formula (4)}$$

In this implementation, after the preset position that is in the target background template and that matches the human body portrait is determined, scaling processing is performed on the human body portrait by using the camera parameter of the target camera and the distance between the imaging object corresponding to the preset position matching the human body portrait and the optical center of the target camera along the principal optical axis direction of the target camera, so that a size of the human body portrait on which the scaling processing is performed matches the target background template. When the obtained human body portrait is a three-dimensional image, projection transformation may be further performed on the three-dimensional human body portrait on which scaling processing is performed by using a camera parameter of the target camera, to obtain a two-dimensional human body portrait. By adjusting a rotation matrix in an extrinsic parameter matrix of the target camera, an up-down rotation angle (that is, a human body tilt angle) and/or a left-right rotation angle (that is, a human body deflection angle) of the human body portrait may be further adjusted, and a translation matrix in the extrinsic parameter matrix of the target camera is adjusted, the upper and lower positions and/or the left and right positions of the human body portrait in the target background template may be further adjusted, so that a manner of fusion between the human body portrait and the target background template is more flexible, and a matching effect of the human body portrait and the target background template is better.

In a second implementation, the target template information of the target background template includes size information of the preset position in the target background template. After the preset position that is in the target background template and that matches the human body portrait is determined, scaling processing is performed, based on an original size of the human body portrait and a size of the preset position matching the human body portrait, on the human body portrait, so that a target size of the human body portrait on which the scaling processing is performed matches the size of the preset position matching the human body portrait, and then placing the human body portrait on which the scaling processing is performed at a preset position that is in the target background template and that matches the human body portrait.

For example, if the size information of the preset position includes a pixel height of the preset position, a width and a height of the human body portrait may be scaled proportionally, so that a pixel height of a human body portrait obtained through scaling is the same as or close to the pixel height of the preset position matching the human body portrait.

In the image generation method provided in this embodiment of this application, a preset position associated with human body posture information is preconfigured in a background template. When a background of an image is changed, a human body portrait is placed, based on the human body posture information of the human body portrait in the image, at the preset position that is in the background template and that matches the human body portrait, so that the human body portrait matches the background template, thereby achieving a good imaging effect of a synthesized image. In addition, the human body key point in the human body portrait is arranged in a human body key point region corresponding to a preset position that is in the target background template and that matches the human body portrait, so that a fusion effect of the human body portrait and the target background template can be improved, thereby improving an imaging effect of the synthesized image.

It should be noted that the image generation method provided in this embodiment of this application may be used to change a background of a single image, to protect user privacy; and may be further used to aggregate human body portraits in a plurality of images, to aggregate and present the human body portraits in the plurality of images on one background template. In a video conference scenario, human body portraits in a plurality of video conference images from a plurality of conference terminals are aggregated and presented on one background template, so that a collaboration atmosphere of a plurality of participants can be improved.

Optionally, the image generation method provided in embodiments of this application has a plurality of implementation scenarios. The following embodiments of this application separately describe implementation processes of the solutions of this application in different implementation scenarios.

In a first implementation scenario, an image generation method 1900 is provided. Refer to FIG. 19. FIG. 19 is a schematic flowchart of an image generation method 1900 according to an embodiment of this application. The method 1900 includes the following steps 1901 to 1907. Optionally, an application scenario on which the method 1900 is based is shown in FIG. 1. A terminal A and a terminal B in the method 1900 are different terminals in FIG. 1.

Step 1901: A terminal A performs instance segmentation on a first image to obtain a human body portrait in the first image.

The first image is collected by the terminal A, or the first image is collected by an image collection device connected to the terminal A. For explanations and definitions of the human body portrait, refer to related descriptions in step 301. For a specific implementation process of step 1901, refer to related descriptions in step 3011. Details are not described herein again in this embodiment of this application.

Step 1902: The terminal A performs posture estimation on the human body portrait in the first image to obtain human body description information of the human body portrait.

The human body description information includes human body posture information. For explanations and definitions of the human body description information, refer to related descriptions in step 301. For a specific implementation process of step 1902, refer to related descriptions in step 3012. Details are not described herein again in this embodiment of this application.

Step 1903: The terminal A sends the human body portrait in the first image and the human body description information of the human body portrait to a terminal B.

Step 1904: The terminal B obtains, based on one or more human body portraits and the human body posture information of each human body portrait, a target background template and target template information of the target background template.

The one or more human body portraits include the human body portrait received by the terminal B from the terminal A. Optionally, the one or more human body portraits further include a human body portrait in a second image. The second image is collected by the terminal B, or the second image is collected by an image collection device connected to the terminal B. A collection moment of the second image is the same as a collection moment of the first image. For a manner in which the terminal B obtains the human body portrait and the human body description information of the human body portrait in the second image, refer to the process in which the terminal A obtains the human body portrait and the human body description information of the human body portrait in the first image in step 1901 to step 1902. Details are not described herein again in this embodiment of this application. If the human body portrait based on which the terminal B obtains the target background template includes the human body portrait in the second image, the synthesized image finally obtained by the terminal B includes the human body portrait from the terminal A and the human body portrait from the terminal B. In other words, the terminal B aggregates and presents the human body portraits from a plurality of terminals on one background template.

Optionally, the terminal B pre-stores a plurality of background templates. For explanations and definitions of the background template, refer to related descriptions in step 302. Details are not described in this embodiment of this application again. Optionally, an implementation process of step 1904 includes the following step 19041 to step 19043.

In step 19041, the terminal B obtains, based on the one or more human body portraits and the human body posture information of the human body portrait, a plurality of to-be-selected background templates and template information of the to-be-selected background template.

The to-be-selected background template includes a preset position that matches the one or more human body portraits obtained by the terminal B. The template information of the to-be-selected background template includes human body posture information associated with a preset position in the to-be-selected background template. For explanations and definitions of the to-be-selected background template and the template information of the to-be-selected background template, refer to related descriptions of the target background template and the target template information in step 302. Details are not described herein again in this embodiment of this application.

In step 19042, the terminal B displays a plurality of to-be-selected background templates.

Figure 20:
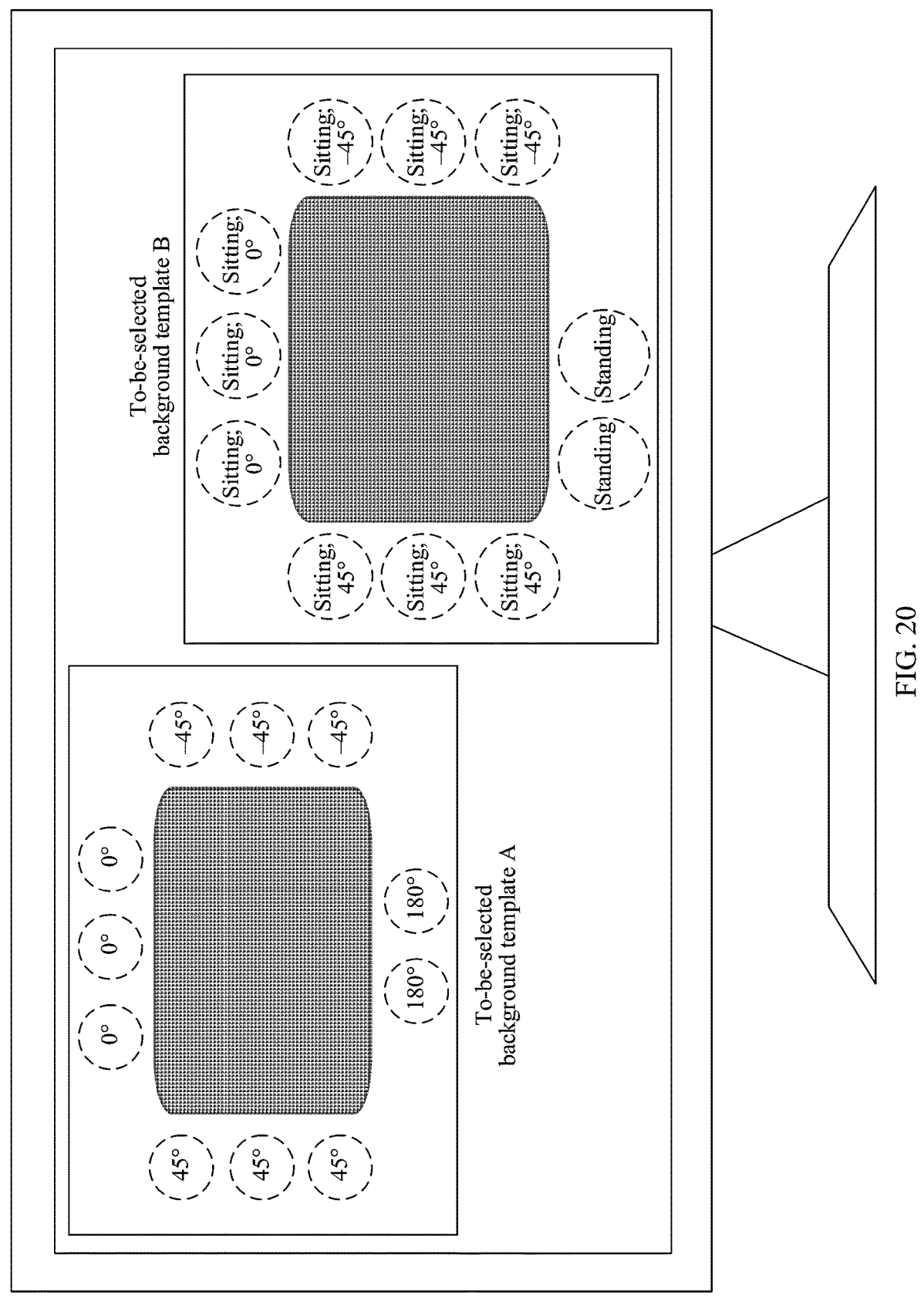
FIG. 20 is a schematic diagram of a display interface of a terminal according to an embodiment of this application.

For example, the human body portraits obtained by the terminal B are shown in FIG. 7. FIG. 20 is a schematic diagram of a display interface of a terminal according to an embodiment of this application. As shown in FIG. 20, the terminal B displays a to-be-selected background template A and a to-be-selected background template B, and both the to-be-selected background template A and the to-be-selected background template B can be used to arrange a plurality of human body portraits shown in FIG. 7.

In step 19043, in response to a selection instruction for a first to-be-selected background template in the plurality of to-be-selected background templates, the terminal B determines the first to-be-selected background template as the target background template, and determines template information of the first to-be-selected background template as the target template information.

Optionally, when the terminal B detects a trigger operation for the first to-be-selected background template, the terminal B determines that the selection instruction for the first to-be-selected background template is received. The trigger operation may be a single-tap operation, a double-tap operation, a touch and hold operation, or the like.

In this embodiment of this application, when the terminal obtains a plurality of to-be-selected background templates based on the human body portrait and the human body posture information of the human body portrait, the plurality of to-be-selected background templates may be displayed on a display interface for a user to select, thereby improving user experience.

Step 1905: The terminal B places, based on the human body description information of the one or more human body portraits and the target template information, the human body portrait at a preset position that is in the target background template and that matches each human body portrait, to obtain a synthesized image.

For a specific implementation process of step 1905, refer to related descriptions in step 303. Details are not described herein again in this embodiment of this application.

Optionally, after obtaining the synthesized image, the terminal B may further perform the following step 1906 and step 1907.

Step 1906: The terminal B displays the synthesized image and a background adjustment control.

The background adjustment control is used to adjust a background of a synthesized background. Optionally, the background adjustment control includes one or more of a brightness adjustment control, a contrast adjustment control, a zoom control, or a rotation direction adjustment control. The brightness adjustment control is used to adjust background brightness. The contrast control is used to adjust background contrast. The zoom control is used to adjust a size of a background. The rotation direction adjustment control includes a left-right rotation adjustment control and/or an up-down rotation adjustment control. The left-right rotation adjustment control is used to adjust a left-right angle of view of a background, and the up-down rotation adjustment control is used to adjust a top-down angle of view of a background. When the selected target background template is a wide-angle picture, the rotation direction adjustment control may be displayed on the synthesized image.

Figure 21:
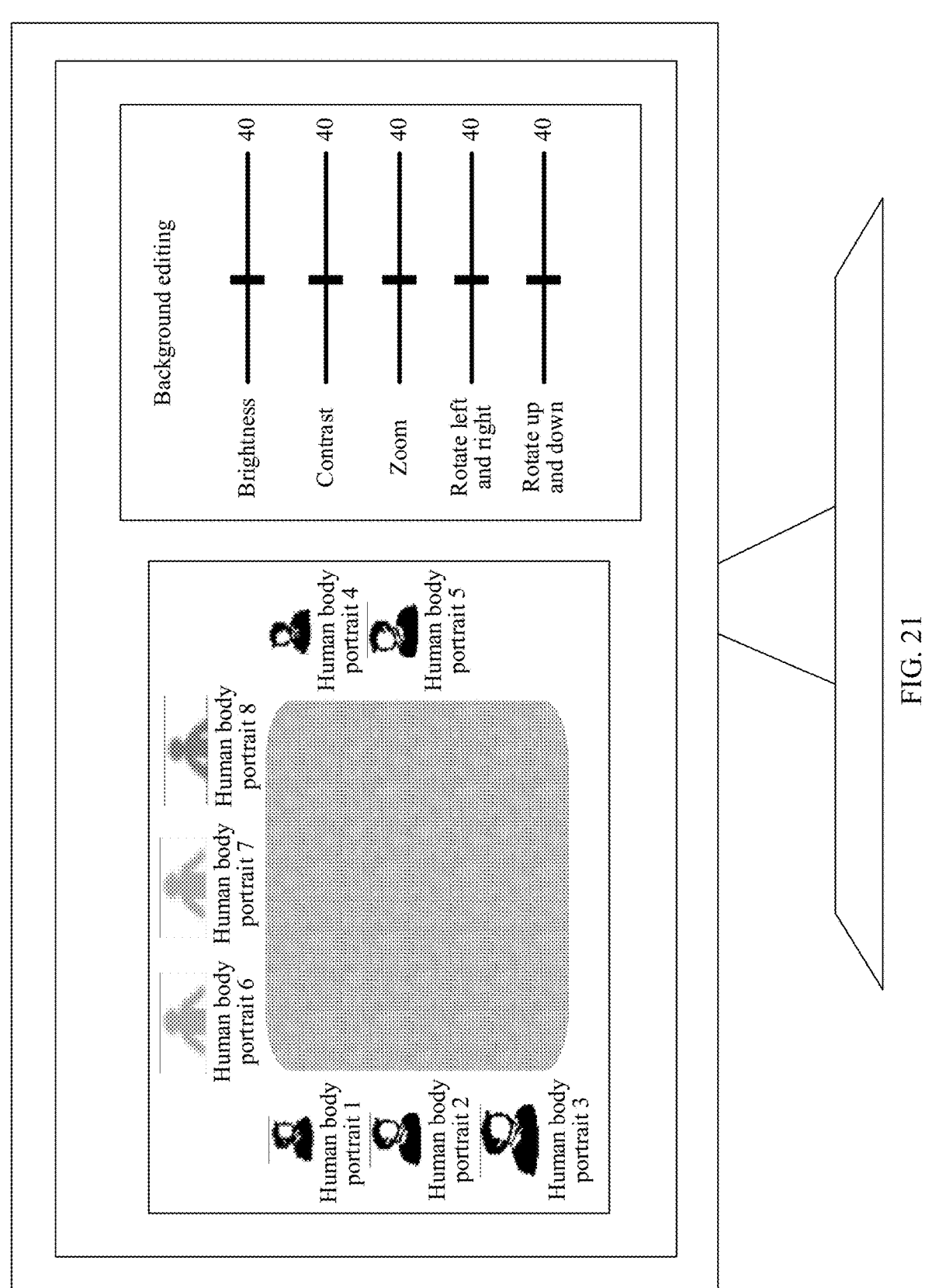
FIG. 21 is a schematic diagram of a display interface of another terminal according to an embodiment of this application.

For example, FIG. 21 is a schematic diagram of a display interface of another terminal according to an embodiment of this application. As shown in FIG. 21, the terminal B displays a synthesized image shown in FIG. 17 and a background editing interface. The background editing interface includes a brightness adjustment control, a contrast adjustment control, a zoom control, a left-right rotation adjustment control, and an up-down rotation adjustment control.

Step 1907: In response to a control instruction for the background adjustment control, the terminal B adjusts the background of the synthesized image based on the control instruction.

For example, in response to the control instruction for the scaling control, the terminal B adjusts the focal length of the target camera based on the control instruction, to adjust the background size. For another example, in response to the control instruction for the rotation adjustment control, the terminal B adjusts the rotation matrix in the extrinsic parameter of the target camera based on the control instruction, to adjust an angle of view of the background.

Optionally, after adjusting the background of the synthesized image, the terminal B may update the stored camera parameter of the target camera, so that the terminal B may subsequently directly use the adjusted target background template, thereby reducing a probability of adjusting the background by the user, and improving user experience.

In this embodiment of this application, the terminal displays the synthesized image and the background adjustment control for the synthesized image. The user may finely adjust the background of the synthesized image by operating the background adjustment control, to improve a visual effect and improve user experience.

Figure 22:
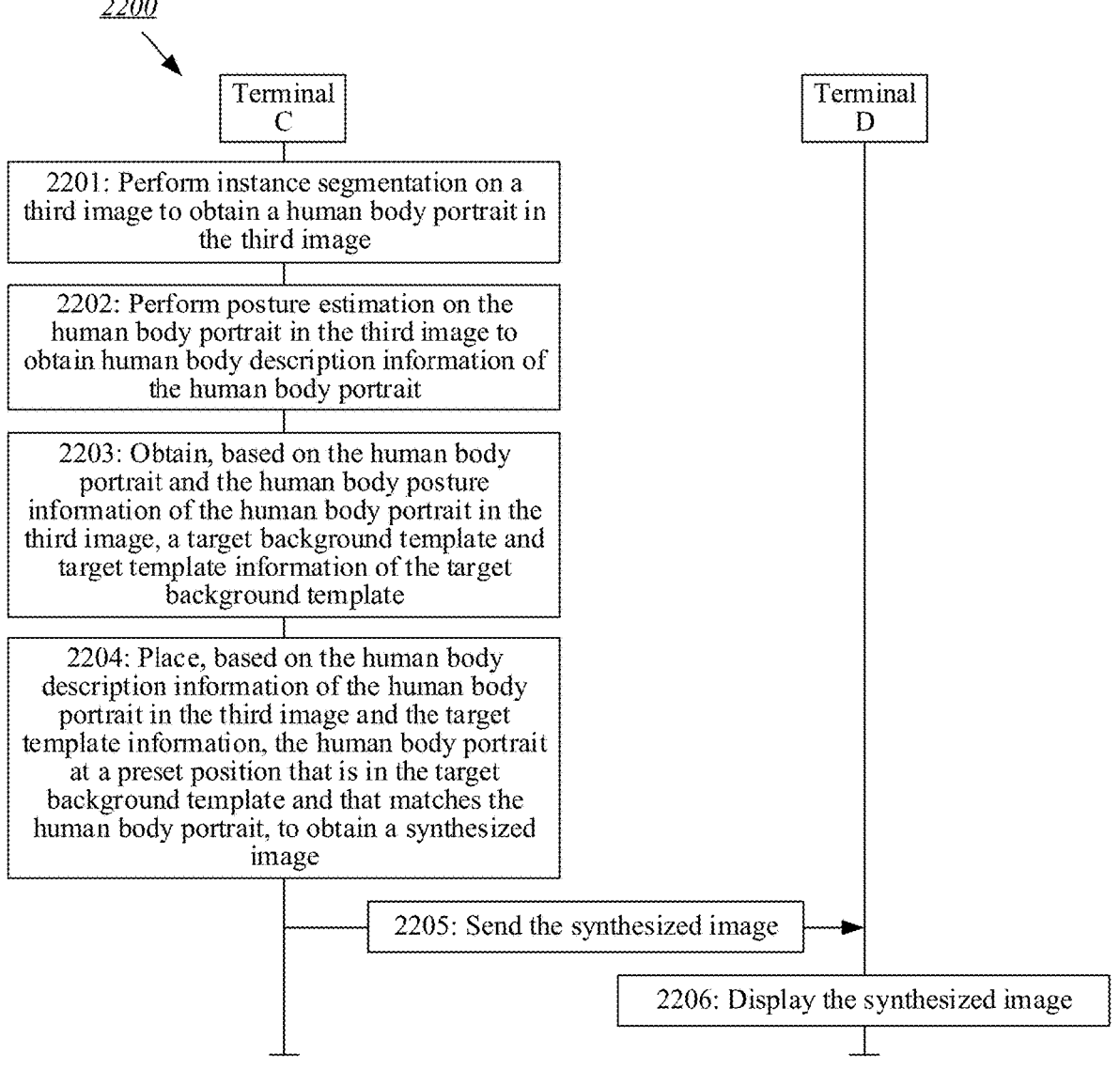
FIG. 22 is a schematic flowchart of still another image generation method according to an embodiment of this application.

In a second implementation scenario, an image generation method 2200 is provided. Refer to FIG. 22. FIG. 22 is a schematic flowchart of an image generation method 2200 according to an embodiment of this application. The method

2200 includes the following steps 2201 to 2206. Optionally, an application scenario on which the method 2200 is based is shown in FIG. 1. A terminal C and a terminal D in the method 2200 are different terminals in FIG. 1.

Step 2201: A terminal C performs instance segmentation on a third image to obtain a human body portrait in the third image.

The third image is collected by the terminal C, or the third image is collected by an image collection device connected to the terminal C. For explanations and definitions of the human body portrait, refer to related descriptions in step 301. For a specific implementation process of step 2201, refer to related descriptions in step 3011. Details are not described herein again in this embodiment of this application.

Step 2202: The terminal C performs posture estimation on the human body portrait in the third image to obtain human body description information of the human body portrait.

The human body description information includes human body posture information. For explanations and definitions of the human body description information, refer to related descriptions in step 301. For a specific implementation process of step 2202, refer to related descriptions in step 3012. Details are not described herein again in this embodiment of this application.

Step 2203: The terminal C obtains, based on the human body portrait and the human body posture information of the human body portrait in the third image, a target background template and target template information of the target background template.

For a specific implementation process of step 2203, refer to related descriptions in step 1904. Details are not described herein again in this embodiment of this application.

Step 2204: The terminal C places, based on the human body description information of the human body portrait in the third image and the target template information, the human body portrait at a preset position that is in the target background template and that matches the human body portrait, to obtain a synthesized image.

For a specific implementation process of step 2204, refer to related descriptions in step 303. Details are not described herein again in this embodiment of this application.

Step 2205: The terminal C sends the synthesized image to a terminal D.

Step 2206: The terminal D displays the synthesized image.

Optionally, the terminal D may further display a background adjustment control, and may further adjust a background of the synthesized image based on a control instruction for the background adjustment control. For details of this implementation process, refer to related descriptions in step 1906 and step 1907. Details are not described herein again in this embodiment of this application.

In the foregoing first implementation scenario and second implementation scenario, only a process of implementing synthesized image display on a terminal is described. In a video conference or a video chat scenario, a terminal of each participant may display a synthesized image corresponding to the terminal. A process of implementing synthesized image display on each terminal is similar. Therefore, details are not described in this embodiment of this application.

Figure 23:
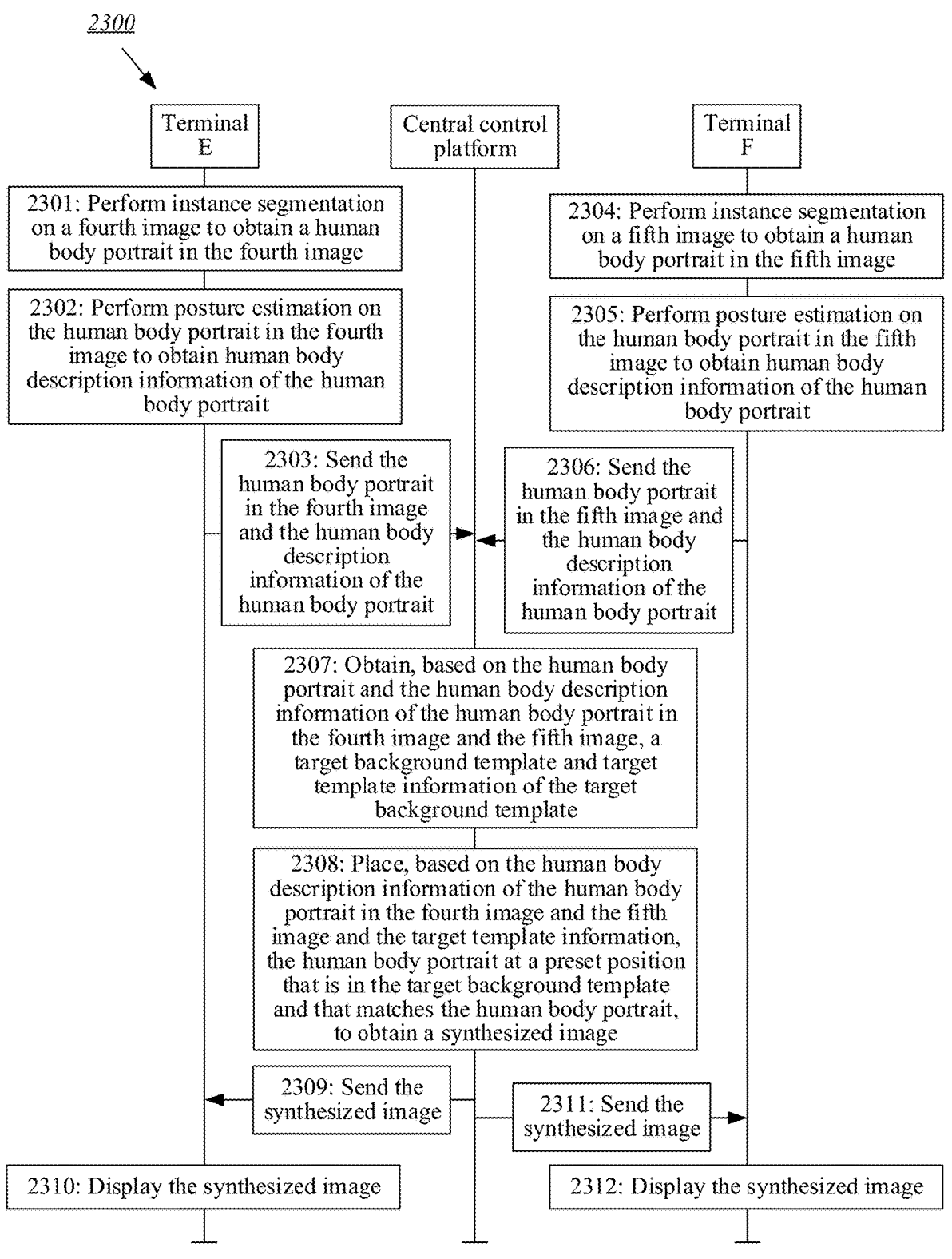
FIG. 23 is a schematic flowchart of still another image generation method according to an embodiment of this application.

In a third implementation scenario, an image generation method 2300 is provided. Refer to FIG. 23. FIG. 23 is a schematic flowchart of an image generation method 2300 according to an embodiment of this application. The method 2300 includes the following steps 2301 to 2312. Optionally, an application scenario on which the method 2300 is based is shown in FIG. 2. A terminal E and a terminal F in the method 2300 are different terminals in FIG. 2.

Step 2301: A terminal E performs instance segmentation on a fourth image to obtain a human body portrait in the fourth image.

The fourth image is collected by the terminal E, or the fourth image is collected by an image collection device connected to the terminal E. For explanations and definitions of the human body portrait, refer to related descriptions in step 301. For a specific implementation process of step 2301, refer to related descriptions in step 3011. Details are not described herein again in this embodiment of this application.

Step 2302: The terminal E performs posture estimation on the human body portrait in the fourth image, to obtain human body description information of the human body portrait.

The human body description information includes human body posture information. For explanations and definitions of the human body description information, refer to related descriptions in step 301. For a specific implementation process of step 2302, refer to related descriptions in step 3012. Details are not described herein again in this embodiment of this application.

Step 2303: The terminal E sends the human body portrait in the fourth image and the human body description information of the human body portrait to a central control platform.

Step 2304: The terminal F performs instance segmentation on a fifth image to obtain a human body portrait in the fifth image.

The fifth image is collected by the terminal F, or the fifth image is collected by an image collection device connected to the terminal F. For explanations and definitions of the human body portrait, refer to related descriptions in step 301. For a specific implementation process of step 2304, refer to related descriptions in step 3011. Details are not described herein again in this embodiment of this application.

Step 2305: The terminal F performs posture estimation on the human body portrait in the fifth image, to obtain human body description information of the human body portrait.

The human body description information includes human body posture information. For explanations and definitions of the human body description information, refer to related descriptions in step 301. For a specific implementation process of step 2302, refer to related descriptions in step 3012. Details are not described herein again in this embodiment of this application.

Step 2306: The terminal F sends the human body portrait in the fifth image and the human body description information of the human body portrait to the central control platform.

Step 2307. The central control platform obtains, based on the human body portrait and the human body description information of the human body portrait in the fourth image and the fifth image, a target background template and target template information of the target background template.

For a specific implementation process of step 2307, refer to related descriptions in step 1904. Details are not described herein again in this embodiment of this application.

Step 2308: The central control platform places, based on the human body description information of the human body portrait in the fourth image and the fifth image and the target template information, the human body portrait at a preset position that is in the target background template and that matches the human body portrait, to obtain a synthesized image.

For a specific implementation process of step 2308, refer to related descriptions in step 303. Details are not described herein again in this embodiment of this application.

Step 2309: The central control platform sends the synthesized image to the terminal E.

Step 2310: The terminal E displays the synthesized image.

For a specific implementation process of step 2310, refer to related descriptions in step 2206. Details are not described herein again in this embodiment of this application.

Step 2311: The central control platform sends the synthesized image to the terminal F.

Step 2312: The terminal F displays the synthesized image.

For a specific implementation process of step 2312, refer to related descriptions in step 2206. Details are not described herein again in this embodiment of this application.

Figure 24:
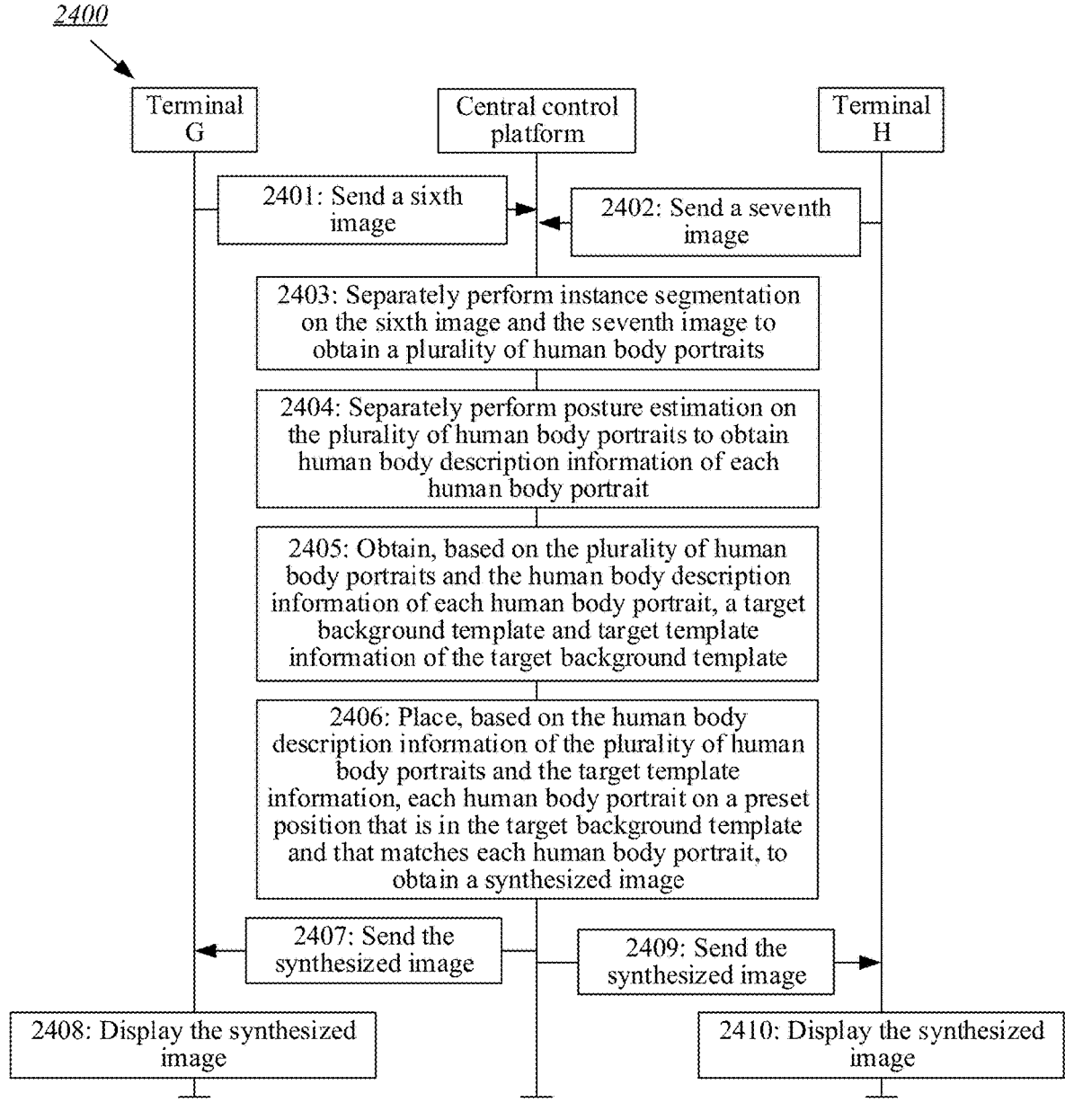
FIG. 24 is a schematic flowchart of yet another image generation method according to an embodiment of this application.

In a fourth implementation scenario, an image generation method 2400 is provided. Refer to FIG. 24. FIG. 24 is a schematic flowchart of an image generation method 2400 according to an embodiment of this application. The method 2400 includes the following steps 2401 to 2410. Optionally, an application scenario on which the method 2400 is based is shown in FIG. 2. A terminal G and a terminal H in the method 2400 are different terminals in FIG. 2.

Step 2401: A terminal G sends a sixth image to a central control platform.

The sixth image is collected by the terminal G, or the sixth image is collected by an image collection device connected to the terminal G.

Step 2402: A terminal H sends a seventh image to the central control platform.

The seventh image is collected by the terminal H, or the seventh image is collected by an image collection device connected to the terminal H.

Step 2403: The central control platform separately performs instance segmentation on the sixth image and the seventh image to obtain a plurality of human body portraits.

For explanations and definitions of the human body portrait, refer to related descriptions in step 301. For a specific implementation process of step 2403, refer to related descriptions in step 3011. Details are not described herein again in this embodiment of this application.

Step 2404: The central control platform separately performs posture estimation on the plurality of human body portraits to obtain human body description information of each human body portrait.

The human body description information includes human body posture information. For explanations and definitions of the human body description information, refer to related descriptions in step 301. For a specific implementation process of step 2404, refer to related descriptions in step 3012. Details are not described herein again in this embodiment of this application.

Step 2405: The central control platform obtains, based on the plurality of human body portraits and the human body description information of each human body portrait, a target background template and target template information of the target background template.

For a specific implementation process of step 2405, refer to related descriptions in step 1904. Details are not described herein again in this embodiment of this application.

Step 2406: The central control platform places, based on the human body description information of the plurality of human body portraits and the target template information, each human body portrait on a preset position that is in the target background template and that matches each human body portrait, to obtain a synthesized image.

For a specific implementation process of step 2406, refer to related descriptions in step 303. Details are not described herein again in this embodiment of this application.

Figure 25:
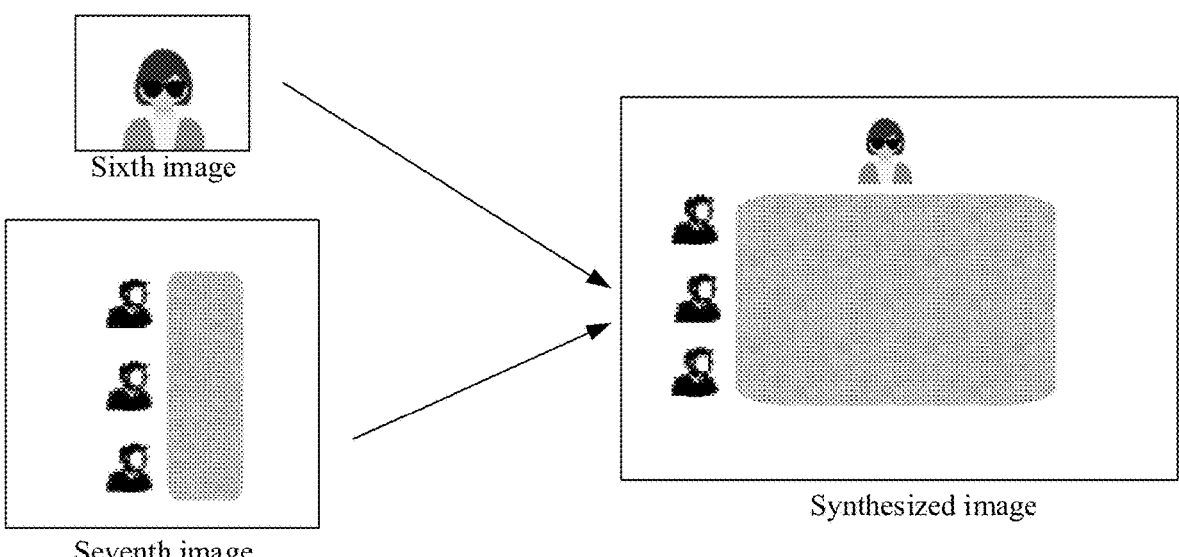
FIG. 25 is a schematic conversion diagram of obtaining a synthesized image based on a plurality of images according to an embodiment of this application.

For example, FIG. 25 is a schematic conversion diagram of obtaining a synthesized image based on a plurality of images according to an embodiment of this application. As shown in FIG. 25, the human body portrait in the sixth image and the human body portrait in the seventh image are separately placed in the background template shown in FIG. 13, to obtain a synthesized image.

Step 2407: The central control platform sends the synthesized image to the terminal G.

Step 2408: The terminal G displays the synthesized image.

For a specific implementation process of step 2408, refer to related descriptions in step 2206. Details are not described herein again in this embodiment of this application.

Step 2409: The central control platform sends the synthesized image to the terminal H. Step 2410: The terminal H displays the synthesized image.

For a specific implementation process of step 2410, refer to related descriptions in step 2206. Details are not described herein again in this embodiment of this application.

The following describes a software apparatus in embodiments of this application by using an example.

Figure 26:
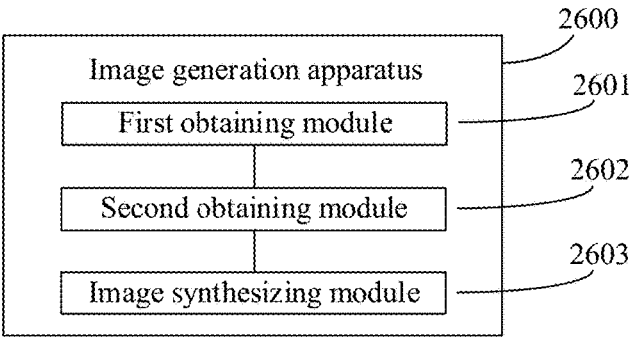
FIG. 26 is a schematic diagram of a structure of an image generation apparatus according to an embodiment of this application.

FIG. 26 is a schematic diagram of a structure of an image generation apparatus according to an embodiment of this application. The image generation apparatus is a terminal or a central control platform. As shown in FIG. 26, the apparatus 2600 includes:

a first obtaining module 2601, configured to obtain one or more human body portraits in at least one image and human body description information of each human body portrait, where the human body description information includes human body posture information;

a second obtaining module 2602, configured to obtain a target background template and target template information of the target background template, where the target background template includes a preset position matching each human body portrait, and the target template information includes human body posture information associated with the preset position; and an image synthesizing module 2603, configured to place, based on the human body description information and the target template information, each human body portrait at the preset position that is in the target background template and that matches each human body portrait, to obtain a synthesized image.

Optionally, the human body posture information includes a human body deflection angle and/or a human body posture.

Optionally, the human body description information further includes a first location indication for a human body key point in each human body portrait, the target template information further includes a second location indication for a human body key region at the preset position, and the image synthesizing module 2603 is configured to: arrange, based on the first location indication and the second location indication, the human body key point in each human body portrait into the human body key region corresponding to the preset position that is in the target background template and that matches each human body portrait.

Optionally, the one or more human body portraits include a first human body portrait and a second human body portrait that have same human body posture information, and an original size of the first human body portrait is greater than an original size of the second human body portrait; and a distance between a preset position at which the first human body portrait is located and a target camera is less than a distance between a preset position at which the second human body portrait is located and the target camera, a target size of the first human body portrait in the synthesized image is greater than a target size of the second human body portrait, and the target camera is a camera corresponding to the target background template.

Optionally, the target template information further includes a distance between an imaging object corresponding to the preset position and an optical center of the target camera along a principal optical axis direction of the target camera and a camera parameter of the target camera, where the target camera is the camera corresponding to the target background template, and the image synthesizing module 2603 is configured to: perform scaling processing on each human body portrait based on the distance between the imaging object corresponding to the preset position and the optical center of the target camera along the principal optical axis direction of the target camera; and place each human body portrait on which the scaling processing is performed on the preset position that is in the target background template and that matches each human body portrait.

Optionally, the first obtaining module 2601 is configured to: perform instance segmentation on the image to obtain each human body portrait in the image; and perform posture estimation on each human body portrait to obtain the human body description information of each human body portrait.

Optionally, the image is a three-dimensional image, and the first obtaining module 2601 is configured to: perform three-dimensional posture estimation on each human body portrait.

Optionally, the second obtaining module 2602 is configured to: obtain, based on the one or more human body portraits and the human body posture information of each human body portrait, the target background template and the target template information.

Optionally, the second obtaining module 2602 is configured to: obtain, based on the one or more human body portraits and the human body posture information of each human body portrait, a plurality of to-be-selected background templates and template information of the to-be-selected background templates, where the to-be-selected background template includes the preset position matching each human body portrait, and the template information includes the human body posture information associated with the preset position; display the plurality of to-be-selected background templates; and determine, in response to a selection instruction for a first to-be-selected background template in the plurality of to-be-selected background templates, the first to-be-selected background template as the target background template, and determine template information of the first to-be-selected background template as the target template information.

Figure 27:
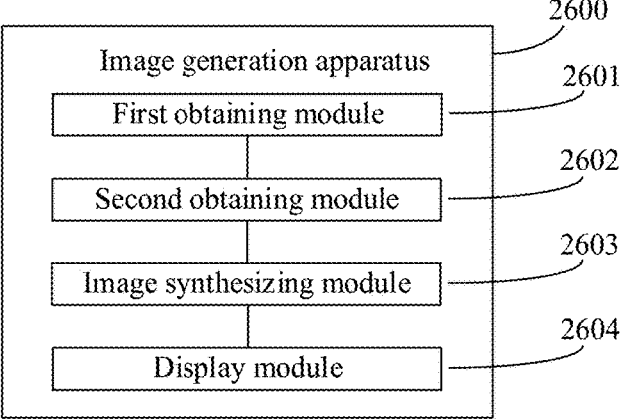
FIG. 27 is a schematic diagram of a structure of another image generation apparatus according to an embodiment of this application.
Figure 28:
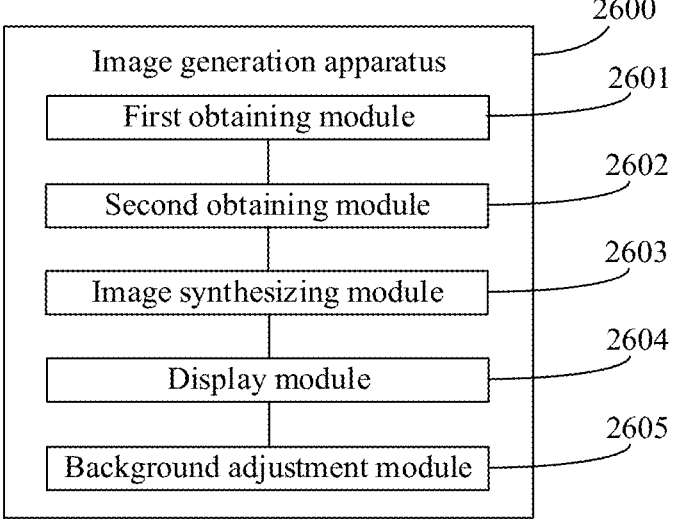
FIG. 28 is a schematic diagram of a structure of still another image generation apparatus according to an embodiment of this application.

Optionally, as shown in FIG. 27, the apparatus 2600 further includes: a display module 2604, configured to display the synthesized image and a background adjustment control, where the background adjustment control is configured to adjust a background of the synthesized image; and Optionally, as shown in FIG. 28, the apparatus 2600 further includes: a background adjustment module 2605, configured to adjust, in response to a control instruction for the background adjustment control, the background of the synthesized image based on the control instruction.

For the apparatus in the foregoing embodiment, specific manners of executing operations by each module are described in detail in embodiments related to the method, and details are not described herein.

The following describes a hardware apparatus in embodiments of this application by using an example.

Figure 29:
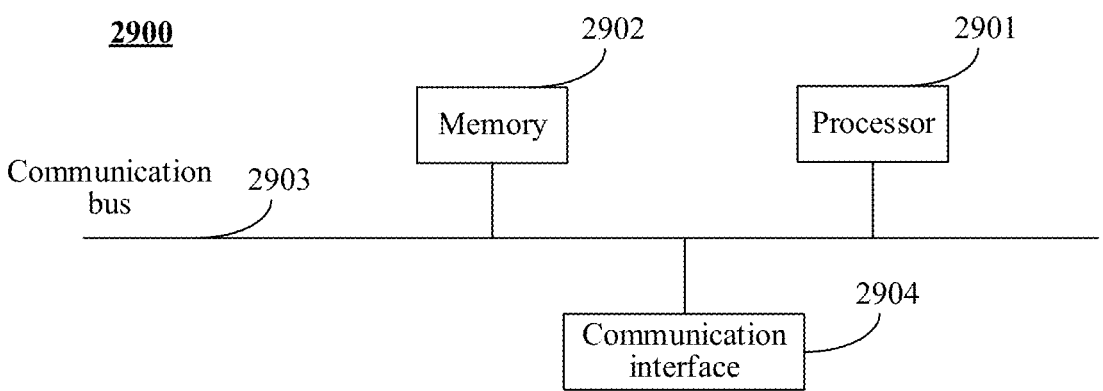
FIG. 29 is a block diagram of an image generation apparatus according to an embodiment of this application.

FIG. 29 is a block diagram of an image generation apparatus according to an embodiment of this application. The image generation apparatus may be a terminal or a central control platform. The terminal may be an electronic device that has a display function and an image processing function, such as a large screen, an electronic whiteboard, a mobile phone, a tablet computer, or an intelligent wearable device. The central control platform may be a server, a server cluster including several servers, or a cloud computing center. As shown in FIG. 29, the image generation apparatus 2900 includes a processor 2901 and a memory 2902.

The memory 2902 is configured to store a computer program, and the computer program includes program instructions.

The processor 2901 is configured to invoke the computer program to implement the method shown in FIG. 3, or implement the steps performed by the terminal B in the method 1900 shown in FIG. 19, or implement the steps performed by the terminal C in the method 2200 shown in FIG. 22, or implement the steps performed by the central control platform in the method 2300 shown in FIG. 23, or implement the steps performed by the central control platform in the method 2400 shown in FIG. 24.

Optionally, the image generation apparatus 2900 further includes a communication bus 2903 and a communication interface 2904.

The processor 2901 includes one or more processing cores, and the processor 2901 executes various functional applications and data processing by running the computer program.

The memory 2902 may be configured to store a computer program. Optionally, the memory may store an operating system and an application program unit that is required for at least one function. The operating system may be an operating system such as a real time operating system (RTX), LINUX, UNIX, WINDOWS, or OS X.

There may be a plurality of communication interfaces 2904, and the communication interface 2904 is configured to communicate with another storage device or network device. For example, in this embodiment of this application, the communication interface of the terminal may be configured to receive and send a human body portrait, description information of the human body portrait, and the like. The network device may be a switch, a router, or the like.

The memory 2902 and the communication interface 2904 are separately connected to the processor 2901 by using the communication bus 2903.

The following describes a system in an embodiment of this application by using an example.

An embodiment of this application provides an image generation system, including a first terminal and a second terminal.

The first terminal is configured to perform instance segmentation on a first image to obtain a human body portrait in the first image, and perform posture estimation on the human body portrait to obtain human body description information of the human body portrait, where the human body description information includes human body posture information, and the first image is collected by the first terminal, or the first image is collected by an image collection device connected to the first terminal;

the first terminal is further configured to send the human body portrait in the first image and the human body description information of the human body portrait to the second terminal;

the second terminal is configured to obtain, based on one or more human body portraits and human body posture information of each human body portrait, a target background template and target template information of the target background template, where the one or more human body portraits include the human body portrait in the first image, the target background template includes a preset position matching each human body portrait, and the target template information includes human body posture information associated with the preset position;

the second terminal is further configured to place, based on the human body description information and the target template information, each human body portrait at the preset position that is in the target background template and that matches each human body portrait, to obtain a synthesized image; and the second terminal is further configured to display the synthesized image.

Optionally, the one or more human body portraits further include a human body portrait in a second image, and the second image is collected by the second terminal, or the second image is collected by an image collection device connected to the second terminal; and the second terminal is further configured to perform instance segmentation on the second image to obtain the human body portrait in the second image, and perform posture estimation on the human body portrait to obtain human body description information of the human body portrait.

An embodiment of this application provides another image generation system, including a first terminal and a second terminal.

The first terminal is configured to perform instance segmentation on a first image to obtain a human body portrait in the first image, and perform posture estimation on the human body portrait to obtain human body description information of the human body portrait, where the human body description information includes human body posture information, and the first image is collected by the first terminal, or the first image is collected by an image collection device connected to the first terminal;

the first terminal is further configured to obtain, based on the human body portrait and the human body posture information of the human body portrait, a target background template and target template information of the target background template, where the target background template includes a preset position matching the human body portrait, and the target template information includes human body posture information associated with the preset position;

the first terminal is further configured to place, based on the human body description information and the target template information, the human body portrait at the preset position that is in the target background template and that matches the human body portrait, to obtain a synthesized image;

the first terminal is further configured to send the synthesized image to the second terminal; and the second terminal is configured to display the synthesized image.

An embodiment of this application provides still another image generation system, including a central control platform and a plurality of terminals.

The terminal is configured to perform instance segmentation on an image to obtain a human body portrait in the image, and perform posture estimation on the human body portrait to obtain human body description information of the human body portrait, where the human body description information includes human body posture information, and the image is collected by the terminal, or the image is collected by an image collection device connected to the terminal;

the terminal is further configured to send the human body portrait and the human body description information of the human body portrait to the central control platform;

the central control platform is configured to obtain, based on the human body portrait and the human body posture information of the human body portrait from each of the plurality of terminals, a target background template and target template information of the target background template, where the target background template includes a preset position matching each human body portrait, and the target template information includes human body posture information associated with the preset position;

the central control platform is further configured to place, based on the human body description information and the target template information, each human body portrait at the preset position that is in the target background template and that matches each human body portrait, to obtain a synthesized image;

the central control platform is further configured to send the synthesized image to the plurality of terminals respectively; and the terminal is further configured to display the synthesized image.

An embodiment of this application provides yet another image generation system, including a central control platform and a plurality of terminals.

The terminal is configured to send an image to the central control platform, where the image is obtained by collection of the terminal, or the image is obtained by collection of an image collection device connected to the terminal;

the central control platform is configured to separately perform instance segmentation on a plurality of images from the plurality of terminals to obtain human body portraits in the plurality of images, and perform posture estimation on each human body portrait to obtain human body description information of each human body portrait, where the human body description information includes human body posture information;

the central control platform is further configured to obtain, based on each human body portrait and the human body posture information of each human body portrait, a target background template and target template information of the target background template, where the target background template includes a preset position matching each human body portrait, and the target template information includes human body posture information associated with the preset position;

the central control platform is further configured to place, based on the human body description information and the target template information, each human body portrait at the preset position that is in the target background template and that matches each human body portrait, to obtain a synthesized image;

the central control platform is further configured to send the synthesized image to the plurality of terminals respectively; and the terminal is further configured to display the synthesized image.

An embodiment of this application further provides a computer-readable storage medium. The computer-readable storage medium stores instructions. When the instructions are executed by a processor, the method shown in FIG. 3, or the steps performed by the terminal B in the method 1900 shown in FIG. 19, or the steps performed by the terminal C in the method 2200 shown in FIG. 22, or the steps performed by the central control platform in the method 2300 shown in FIG. 23, or the steps performed by the central control platform in the method 2400 shown in FIG. 24 are implemented.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

In embodiments of this application, the terms "first", "second", and "third" are merely used for description, but cannot be understood as an indication or implication of relative importance.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are only optional embodiments of this application, but are not intended to limit this application. Any modification, equivalent replacement, or improvement made within the concept and principle of this application should fall within the protection scope of this application.

What is claimed is:

1. An image generation method implemented by an apparatus comprising a processor, the method comprising:

obtaining a plurality of human body portraits in at least one image and human body description information of each human body portrait, wherein the human body description information comprises human body posture information;

obtaining a target background template and target template information of the target background template, wherein the target background template comprises a plurality of preset positions matching respective human body portraits, and the target template information comprises human body posture information associated with the plurality of preset positions; and placing, based on the human body description information and the target template information, the plurality of human body portraits at corresponding preset positions in the target background template, to obtain a synthesized image, wherein human body portraits having same human body posture information are arranged based on original sizes of the human body portraits and distances between preset positions associated with the same human body posture information and a target camera.

2. The method of claim 1, wherein the human body posture information comprises at least one of a human body deflection angle or a human body posture.

3. The method of claim 1, wherein the human body description information further comprises a first location indication for a human body key point in each human body portrait, the target template information further comprises a second location indication for a human body key region at the preset position, and the placing, based on the human body description information and the target template information, the plurality of human body portraits at corresponding preset positions in the target background template comprises:

arranging, based on the first location indication and the second location indication, the human body key point in each human body portrait into the human body key region corresponding to the preset position that is in the target background template and that matches each human body portrait.

4. The method of claim 1, wherein the plurality of human body portraits comprise a first human body portrait and a second human body portrait that have same human body posture information, and an original size of the first human body portrait is greater than an original size of the second human body portrait; and a distance between a preset position at which the first human body portrait is located and the target camera is less than a distance between a preset position at which the second human body portrait is located and the target camera, a target size of the first human body portrait in the synthesized image is greater than a target size of the second human body portrait, and the target camera is a camera corresponding to the target background template.

5. The method of claim 1, wherein the target template information further comprises a distance between an imaging object corresponding to a preset position and an optical center of the target camera along a principal optical axis direction of the target camera and a camera parameter of the target camera, wherein the target camera is a camera corresponding to the target background template, and the placing each human body portrait at the preset position that is in the target background template and that matches each human body portrait comprises:

performing scaling processing on each human body portrait based on the distance between the imaging object corresponding to the preset position and the optical center of the target camera along the principal optical axis direction of the target camera; and placing each human body portrait on which the scaling processing is performed on the preset position that is in the target background template and that matches each human body portrait.

6. The method of claim 1, wherein the obtaining the plurality of human body portraits in the at least one image and human body description information of each human body portrait comprises:

performing instance segmentation on the image to obtain each human body portrait in the image; and performing posture estimation on each human body portrait to obtain the human body description information of each human body portrait.

7. The method of claim 6, wherein the image is a three-dimensional image, and the performing posture estimation on each human body portrait comprises:

performing three-dimensional posture estimation on each human body portrait.

8. The method of claim 1, wherein the obtaining the target background template and the target template information of the target background template comprises:

obtaining, based on the plurality of human body portraits and the human body posture information associated with the plurality of preset positions, the target background template and the target template information.

9. The method of claim 8, wherein the obtaining, based on the plurality of human body portraits and the human body posture information of each human body portrait, the target background template and the target template information comprises:

obtaining, based on the plurality of human body portraits and the human body posture information of each human body portrait, a plurality of to-be-selected background templates and template information of the to-be-selected background templates, wherein the to-be-selected background template comprises the preset position matching each human body portrait, and the template information comprises the human body posture information associated with the plurality of preset positions;

displaying the plurality of to-be-selected background templates; and determining, in response to a selection instruction for a first to-be-selected background template in the plurality of to-be-selected background templates, the first to-be-selected background template as the target background template, and determining template information of the first to-be-selected background template as the target template information.

10. The method of claim 1, after the synthesized image is obtained, the method further comprising:

displaying the synthesized image and a background adjustment control, wherein the background adjustment control is configured to adjust a background of the synthesized image; and adjusting, in response to a control instruction for the background adjustment control, the background of the synthesized image based on the control instruction.

11. An image generation apparatus, comprising a processor and a memory, wherein the memory is configured to store a computer program comprising program instructions that, when executed by the processor, cause the image generation apparatus to perform:

obtaining a plurality of human body portraits in at least one image and human body description information of each human body portrait, wherein the human body description information comprises human body posture information;

obtaining a target background template and target template information of the target background template, wherein the target background template comprises a plurality of preset positions matching respective human body portraits, and the target template information comprises human body posture information associated with the plurality of preset positions; and placing, based on the human body description information and the target template information, the plurality of human body portraits at corresponding preset positions in the target background template, to obtain a synthesized image, wherein human body portraits having same human body posture information are arranged based on original sizes of the human body portraits and distances between preset positions associated with the same human body posture information and a target camera.

12. The image generation apparatus of claim 11, wherein the human body posture information comprises a human body deflection angle and/or a human body posture.

13. The image generation apparatus of claim 11, wherein the human body description information further comprises a first location indication for a human body key point in each human body portrait, the target template information further comprises a second location indication for a human body key region at the preset position, and the placing, based on the human body description information and the target template information, the plurality of human body portraits at corresponding preset positions in the target background template comprises:

arranging, based on the first location indication and the second location indication, the human body key point in each human body portrait into the human body key region corresponding to the preset position that is in the target background template and that matches each human body portrait.

14. The image generation apparatus of claim 11, wherein the plurality of human body portraits comprise a first human body portrait and a second human body portrait that have same human body posture information, and an original size of the first human body portrait is greater than an original size of the second human body portrait; and a distance between a preset position at which the first human body portrait is located and the target camera is less than a distance between a preset position at which the second human body portrait is located and the target camera, a target size of the first human body portrait in the synthesized image is greater than a target size of the second human body portrait, and the target camera is a camera corresponding to the target background template.

15. The image generation apparatus of claim 11, wherein the target template information further comprises a distance between an imaging object corresponding to a preset position and an optical center of the target camera along a principal optical axis direction of the target camera and a camera parameter of the target camera, wherein the target camera is the camera corresponding to the target background template, and the placing each human body portrait at the preset position that is in the target background template and that matches each human body portrait comprises:

performing scaling processing on each human body portrait based on the distance between the imaging object corresponding to the preset position and the optical center of the target camera along the principal optical axis direction of the target camera; and placing each human body portrait on which the scaling processing is performed on the preset position that is in the target background template and that matches each human body portrait.

16. A non-transitory computer-readable storage medium, wherein the non-transitory computer-readable storage medium stores instructions, and when the instructions are executed by a processor, the method comprises:

obtaining a plurality of human body portraits in at least one image and human body description information of each human body portrait, wherein the human body description information comprises human body posture information;

obtaining a target background template and target template information of the target background template, wherein the target background template comprises a plurality of preset positions matching respective human body portraits, and the target template information comprises human body posture information associated with the plurality of preset positions; and placing, based on the human body description information and the target template information, the plurality of human body portraits at corresponding preset positions in the target background template, to obtain a synthesized image, wherein human body portraits having same human body posture information are arranged based on original sizes of the human body portraits and distances between preset positions associated with the same human body posture information and a target camera.

17. The computer-readable storage medium of claim 16, wherein the human body posture information comprises at least one of a human body deflection angle or a human body posture.

18. The computer-readable storage medium of claim 16, wherein the human body description information further comprises a first location indication for a human body key point in each human body portrait, the target template information further comprises a second location indication for a human body key region at the preset position, and the placing, based on the human body description information and the target template information, the plurality of human body portraits at corresponding preset positions in the target background template comprises:

arranging, based on the first location indication and the second location indication, the human body key point in each human body portrait into the human body key region corresponding to the preset position that is in the target background template and that matches each human body portrait.

19. The computer-readable storage medium of claim 16, wherein the plurality of human body portraits comprise a first human body portrait and a second human body portrait that have same human body posture information, and an original size of the first human body portrait is greater than an original size of the second human body portrait; and a distance between a preset position at which the first human body portrait is located and the target camera is less than a distance between a preset position at which the second human body portrait is located and the target camera, a target size of the first human body portrait in the synthesized image is greater than a target size of the second human body portrait, and the target camera is a camera corresponding to the target background template.

20. The computer-readable storage medium of claim 16, wherein the target template information further comprises a distance between an imaging object corresponding to a preset position and an optical center of the target camera along a principal optical axis direction of the target camera and a camera parameter of the target camera, wherein the target camera is a camera corresponding to the target background template, and the placing each human body portrait at the preset position that is in the target background template and that matches each human body portrait comprises:

performing scaling processing on each human body portrait based on the distance between the imaging object corresponding to the preset position and the optical center of the target camera along the principal optical axis direction of the target camera; and placing each human body portrait on which the scaling processing is performed on the preset position that is in the target background template and that matches each human body portrait.

* * * * *